United States Patent
Matsui

(10) Patent No.: US 11,747,814 B2
(45) Date of Patent: *Sep. 5, 2023

(54) AUTONOMOUS DRIVING DEVICE

(71) Applicant: TOYOTA JIDOSHA KABUSHIKI KAISHA, Toyota (JP)

(72) Inventor: Hideyuki Matsui, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

This patent is subject to a terminal disclaimer.

(21) Appl. No.: 17/564,834

(22) Filed: Dec. 29, 2021

(65) Prior Publication Data
US 2022/0121208 A1 Apr. 21, 2022

Related U.S. Application Data

(63) Continuation of application No. 17/085,048, filed on Oct. 30, 2020, now Pat. No. 11,625,038, which is a (Continued)

(30) Foreign Application Priority Data

Aug. 25, 2017 (JP) ................................ 2017-162569

(51) Int. Cl.
*G05D 1/02* (2020.01)
*G01C 21/36* (2006.01)
(Continued)

(52) U.S. Cl.
CPC .......... *G05D 1/0212* (2013.01); *G01C 21/20* (2013.01); *G01C 21/3484* (2013.01);
(Continued)

(58) Field of Classification Search
CPC .... G01C 21/20; G01C 21/32; G01C 21/3484; G01C 21/3602; G01C 21/387;
(Continued)

(56) References Cited

U.S. PATENT DOCUMENTS 8,521,352 B1 8/2013 Ferguson et al.
8,977,499 B1 3/2015 Prokhorov et al.
(Continued)

FOREIGN PATENT DOCUMENTS

EP 1959236 A1 8/2008
JP 2007-225498 A 9/2007
(Continued)

OTHER PUBLICATIONS

Sefati, et al., "Improving Vehicle Localization Using Semantic and Pole-Like Landmarks", 2017 IEEE intelligent Vehicles Symposium, Redondo Beach, CA, Jun. 2017, pp. 13-19 (7 pages total).
(Continued)

*Primary Examiner* — Tyler J Lee
(74) *Attorney, Agent, or Firm* — Sughrue Mion, PLLC

(57) ABSTRACT

An autonomous driving device includes a first map including a first content and a second content associated with positions respectively, a second map including the first content associated with the position and in which the second content is not a recording target, and a control unit performing the autonomous driving. When the autonomous driving is performed using the first map, the control unit determines information necessary for the autonomous driving using a first method based on the first content and the second content. When the autonomous driving is performed using the second map, the control unit determines the information necessary for the autonomous driving using a method same as the first method based on the first content corresponding to a second position recorded in the second map and information indicating that the second content corresponding to the second position recorded in the second map is not present.

3 Claims, 16 Drawing Sheets

Related U.S. Application Data continuation of application No. 16/035,840, filed on Jul. 16, 2018, now Pat. No. 10,852,734.

(51) Int. Cl.
*G01C 21/34* (2006.01)
*G01C 21/00* (2006.01)
*G01C 21/20* (2006.01)

(52) U.S. Cl.
CPC ....... *G01C 21/3602* (2013.01); *G01C 21/387* (2020.08); *G01C 21/3896* (2020.08); *G05D 1/024* (2013.01); *G05D 1/0246* (2013.01); *G05D 1/0274* (2013.01); *G05D 1/0276* (2013.01); *G05D 2201/0213* (2013.01)

(58) Field of Classification Search
CPC .. G01C 21/3896; G05D 1/0212; G05D 1/024; G05D 1/0246; G05D 1/0274; G05D 1/0276; G05D 2201/0213
See application file for complete search history.

(56) References Cited

U.S. PATENT DOCUMENTS

| | | | |
|---|---|---|---|
| 9,102,329 B2 | 8/2015 | Fujita et al. | |
| 9,633,564 B2* | 4/2017 | Ferguson | G01C 21/32 |
| 9,636,981 B2 | 5/2017 | Higgins | |
| 9,802,608 B2 | 10/2017 | Urano et al. | |
| 9,886,852 B2 | 2/2018 | Urano | |
| 9,908,464 B2 | 3/2018 | Caveney et al. | |
| 9,909,887 B1 | 3/2018 | Urmson | |
| 9,933,783 B2 | 4/2018 | Kindo et al. | |
| 9,944,283 B2 | 4/2018 | Kindo et al. | |
| 10,018,473 B2 | 7/2018 | Mitzutani et al. | |
| 10,019,017 B2 | 7/2018 | Taguchi | |
| 10,030,978 B2 | 7/2018 | Madimerou | |
| 10,067,506 B2 | 9/2018 | Matsunaga et al. | |
| 10,074,281 B2 | 9/2018 | Pandita et al. | |
| 10,151,598 B2 | 12/2018 | Jurk | |
| 10,249,193 B2 | 4/2019 | Altintas et al. | |
| 10,272,783 B2 | 4/2019 | McNew | |
| 10,310,508 B2 | 6/2019 | Kunisa et al. | |
| 10,310,511 B2 | 6/2019 | Urano et al. | |
| 10,317,908 B2 | 6/2019 | Gaither et al. | |
| 10,353,394 B2 | 7/2019 | Takada et al. | |
| 10,384,676 B2 | 8/2019 | Watanabe | |
| 10,384,684 B2 | 8/2019 | Sogen | |
| 10,423,161 B2 | 9/2019 | Sakima et al. | |
| 10,429,842 B2 | 10/2019 | Kuffner, Jr. | |
| 10,520,939 B2 | 12/2019 | Sato et al. | |
| 10,539,962 B2 | 1/2020 | Sogen et al. | |
| 10,576,984 B2 | 3/2020 | Kanzawa | |
| 10,625,781 B2 | 4/2020 | Kataoka | |
| 10,640,036 B2 | 5/2020 | Watanabe et al. | |
| 10,679,501 B2 | 6/2020 | Caveney et al. | |
| 10,692,369 B2 | 6/2020 | Endo | |
| 10,816,975 B2 | 10/2020 | Gaither et al. | |
| 10,852,734 B2 | 12/2020 | Matsui | |
| 11,320,282 B2 | 5/2022 | Mishina et al. | |
| 2002/0120396 A1 | 8/2002 | Boies et al. | |
| 2007/0299606 A1 | 12/2007 | Fujimoto | |
| 2012/0215377 A1 | 8/2012 | Takemura et al. | |
| 2012/0323473 A1 | 12/2012 | Irie et al. | |
| 2013/0211656 A1 | 8/2013 | An et al. | |
| 2014/0316635 A1 | 10/2014 | Bando et al. | |
| 2015/0253774 A1* | 9/2015 | Takaoka | G01C 21/00 701/23 |
| 2016/0138924 A1 | 5/2016 | An | |
| 2016/0231746 A1 | 8/2016 | Hazelton et al. | |
| 2016/0259335 A1 | 9/2016 | Oyama | |
| 2016/0259814 A1 | 9/2016 | Mizoguchi | |
| 2016/0305787 A1 | 10/2016 | Sato et al. | |
| 2017/0008521 A1 | 1/2017 | Braunstein et al. | |
| 2017/0010613 A1 | 1/2017 | Fukumoto | |
| 2017/0082454 A1 | 3/2017 | Jurk | |
| 2017/0227970 A1 | 8/2017 | Taguchi et al. | |
| 2017/0263120 A1* | 9/2017 | Durie, Jr. | G08G 1/205 |
| 2019/0064826 A1 | 2/2019 | Matsui | |
| 2019/0234745 A1 | 8/2019 | Lee | |
| 2020/0096355 A1 | 3/2020 | Mishina et al. | |
| 2020/0110422 A1 | 4/2020 | Takamatsu et al. | |
| 2021/0048824 A1 | 2/2021 | Matsui | |
| 2022/0121208 A1 | 4/2022 | Matsui | |

FOREIGN PATENT DOCUMENTS

| | | |
|---|---|---|
| JP | 2011-073529 A | 4/2011 |
| JP | 2011-189803 A | 9/2011 |
| JP | 2016-48210 A | 4/2016 |
| JP | 2016-161456 A | 9/2016 |
| JP | 2016-162299 A | 9/2016 |
| WO | 2013/069054 A1 | 5/2013 |

OTHER PUBLICATIONS

Non-Final Office Action dated Sep. 30, 2022 in U.S. Appl. No. 17/085,048.

Notice of Allowance dated Feb. 1, 2023, which issued during the prosecution of U.S. Appl. No. 17/085,048.

* cited by examiner

*Fig.3*

|  | FIRST MAP | SECOND MAP |
|---|---|---|
| LANE BOUNDARY LINE | ○ | ○ |
| POLE | ○ | × |
| TRAFFIC RULE (SPEED LIMIT) | ○ | ○ |
| DATE AND TIME OF UPDATING | ○ | ○ |

Fig.4A

| POSITION [X,Y] | LANE BOUNDARY LINE (PRESENCE OR ABSENCE FLAG) | POLE (PRESENCE OR ABSENCE FLAG) | SPEED LIMIT [km/h] | DATE AND TIME OF UPDATING [YYYYMMDDTTTT] |
|---|---|---|---|---|
| 10,10 | 0 | 1 | 60 | 202001010800 |
| 10,11 | 1 | 1 | 50 | 202001020800 |
| 11,11 | 1 | 0 | 60 | 202001010800 |
| 11,12 | 0 | 1 | 40 | 202001010800 |
| ⋮ | ⋮ | ⋮ | ⋮ | ⋮ |

| POSITION [X,Y] | LANE BOUNDARY LINE (PRESENCE OR ABSENCE FLAG) | SPEED LIMIT [km/h] | DATE AND TIME OF UPDATING [YYYYMMDDTTTT] |
|---|---|---|---|
| 10,10 | 0 | 60 | 202002010800 |
| 10,11 | 1 | 50 | 202002010800 |
| 11,11 | 1 | 60 | 202002010800 |
| 11,12 | 1 | 40 | 202002010800 |
| ⋮ | ⋮ | ⋮ | ⋮ |

| POSITION [X,Y] | LANE BOUNDARY LINE (PRESENCE OR ABSENCE FLAG) | POLE (PRESENCE OR ABSENCE FLAG) | SPEED LIMIT [km/h] | DATE AND TIME OF UPDATING [YYYYMMDDTTTT] |
|---|---|---|---|---|
| 10,10 | 0 | 0 | 60 | 20200201T0800 |
| 10,11 | 1 | 0 | 50 | 20200201T0800 |
| 11,11 | 1 | 0 | 60 | 20200201T0800 |
| 11,12 | 1 | 0 | 40 | 20200201T0800 |
| ... | ... | ... | ... | ... |

AUTONOMOUS DRIVING DEVICE

CROSS-REFERENCE TO RELATED APPLICATION

This application is a Continuation application of U.S. application Ser. No. 17/085,048 filed Oct. 30, 2020, which is a continuation of U.S. application Ser. No. 16/035,840 filed Jul. 16, 2018, now U.S. Pat. No. 10,852,734 issued on Dec. 1, 2020, which is based on Japanese Patent Application No. 2017-162569 filed with Japan Patent Office on Aug. 25, 2017. The entire disclosures of the prior applications are considered part of the disclosure of the accompanying continuation application, and are hereby incorporated herein by reference in their entirety.

TECHNICAL FIELD

The present disclosure relates to an autonomous driving device.

BACKGROUND

Japanese Unexamined Patent Publication No. 2016-161456 discloses a device that performs an autonomous driving on a vehicle. This device performs the autonomous driving using one detailed map.

SUMMARY

It takes a high cost if the detailed map used for the device disclosed in Japanese Unexamined Patent Publication No. 2016-161456 is attempted to be created in detail for all the roads. Therefore, it is conceivable that another map can be used, including the roads and content that are not included in the map disclosed in Japanese Unexamined Patent Publication No. 2016-161456. However, maps are created by each company or each organization according to their own standards, and thus, the recording target contents are not unified. When a plurality of maps are used, in which the recording target contents are different from each other, there is a problem in that it may be necessary to change the method for acquiring information necessary for the autonomous driving of the vehicle for each map. For example, it is assumed that the information necessary for the autonomous driving of the vehicle is acquired by a method using a first content and a second content. In this case, when using a map having a first content as a recording target and having a second content which is not to be the recording target, the method the same as the method described above cannot be applied.

In this technical field, it is desired to provide an autonomous driving device that can acquire the information necessary for the autonomous driving of the vehicle from a plurality of maps in which the recording targets are different from each other using the same method.

An aspect of the present disclosure provides an autonomous driving device configured to perform an autonomous driving on a vehicle. The device includes: a first map in which a first content and a second content are associated with positions respectively; a second map in which the first content is associated with the position and the second content is not a recording target; and a control unit configured to perform the autonomous driving on the vehicle based on any one of the first map and the second map. The control unit is configured to determine information necessary for the autonomous driving of the vehicle using a first method based on the first content and the second content corresponding to a first position recorded in the first map when the autonomous driving is performed using the first map at the first position. The control unit is configured to determine the information necessary for the autonomous driving of the vehicle using a method same as the first method based on the first content corresponding to a second position recorded in the second map and information indicating that the second content corresponding to the second position recorded in the second map is not present when the autonomous driving is performed using the second map at the second position.

In the autonomous driving device, when the first map is used, the information necessary for the autonomous driving of the vehicle is determined using the first method in which the first content and the second content are used, and when the second map in which the second content is not the recording target is used, the information necessary for the autonomous driving of the vehicle is determined using the method same as the first method based on the first content corresponding to the second position recorded in the second map and information indicating that the second content corresponding to the second position recorded in the second map is not present. When the second content is not the recording target, the second content information is generally a null value. The device can regard that the second content as not present by adopting the information indicating that the second content is not present (for example, the presence or absence flag "0") as the second content information. In this way, the device can use the first method under the assumption that the second content is present even when using the map in which the second content is not recorded as the recording target. Accordingly, the device can acquire the information necessary for the autonomous driving of the vehicle from a plurality of maps in which the recording targets are different from each other using the method same as the first method.

In an embodiment, the autonomous driving device may further include a selection unit configured to select any one of the first map and the second map based on a predetermined condition, and the control unit may be configured to perform the autonomous driving on the vehicle using the map selected by the selection unit. In this case, the autonomous driving device can autonomously perform the driving of the vehicle using one map selected from a plurality of maps.

In an embodiment, the selection unit may be configured to select a map of which the date and time of updating is newer between the first map and the second map. In this case, the autonomous driving device can perform the autonomous driving of the vehicle using the map of which the date and time of updating is new.

In an embodiment, the autonomous driving device may further include a measuring unit configured to measure a position of the vehicle via communication, and a determination unit configured to determine a scheduled traveling section in the first map and the second map based on the position of the vehicle measured by the measuring unit. The selection unit may be configured to select a map having a larger number of contents included in the scheduled traveling section between the first map and the second map. In this case, the autonomous driving device can perform the autonomous driving of the vehicle using a map having a larger number of contents.

In an embodiment, the autonomous driving device may further include a measuring unit configured to measure a position of the vehicle via communication, and a determination unit configured to determine a scheduled traveling section in the first map and the second map based on the position of the vehicle measured by the measuring unit. The selection unit may be configured to calculate a difference between the numbers of first contents included in the scheduled traveling sections in the first map and the second map when the date and time of updating the first map is newer than the date and time of updating the second map and when the number of first contents included in the scheduled traveling section in the first map is smaller than the number of first contents included in the scheduled traveling section in the second map. The selection unit may be configured to select the first map when the difference is equal to or greater than a threshold value, and the selection unit may be configured to select the second map when the difference is smaller than the threshold value. In this case, the autonomous driving device can select any one of the maps considering both the date and time of updating and the number of contents, and then, can perform the autonomous driving of the vehicle.

In an embodiment, the autonomous driving device may further include a history database in which the map selected by the selection unit and history information relating to the presence or absence of an override are associated with each other. The selection unit is configured to select a map having a lower override occurrence rate between the first map and the second map referring to the history database. In this case, the autonomous driving device can perform the autonomous driving of the vehicle using a map having a lower override occurrence rate.

In an embodiment, the selection unit may be configured to select a map having a lower override occurrence rate during a predetermined period of time between the first map and the second map. In this case, the autonomous driving device can perform the autonomous driving of the vehicle using a map having a low override occurrence rate per a unit time.

In an embodiment, the autonomous driving device may further include a history database in which the map selected by the selection unit and history information relating to the presence or absence of an override are associated with each other. The selection unit may be configured to select the map in which the number of overrides is 0 during the most recent traveling between the first map and the second map referring to the history database. In this case, the autonomous driving device can perform the autonomous driving of the vehicle using a map in which the override has not occurred during the most recent traveling.

In an embodiment, the control unit may be configured to generate a travel plan in which the vehicle travels within a range not exceeding a predetermined upper limit speed. The upper limit speed may be set higher when the travel plan is generated using the first map compared to the case of generating the travel plan using the second map. In this way, when the number of contents stored in the map is large, the autonomous driving devices can mitigate the speed constraints compared to the case where the number of contents stored in the map is small.

According to the present disclosure, it is possible to acquire the information necessary for the autonomous driving of the vehicle from a plurality of maps in which the recording targets are different from each other using the same methods.

BRIEF DESCRIPTION OF THE DRAWINGS

FIG. 3 is a table for explaining recording targets in the first map and the second map.

FIG. 4A illustrates an example of contents recorded in the first map.

FIG. 4B illustrates an example of contents recorded in the second map.

FIG. 5 illustrates an example of the second map supplemented with a recorded content.

DETAILED DESCRIPTION

Figure 1:
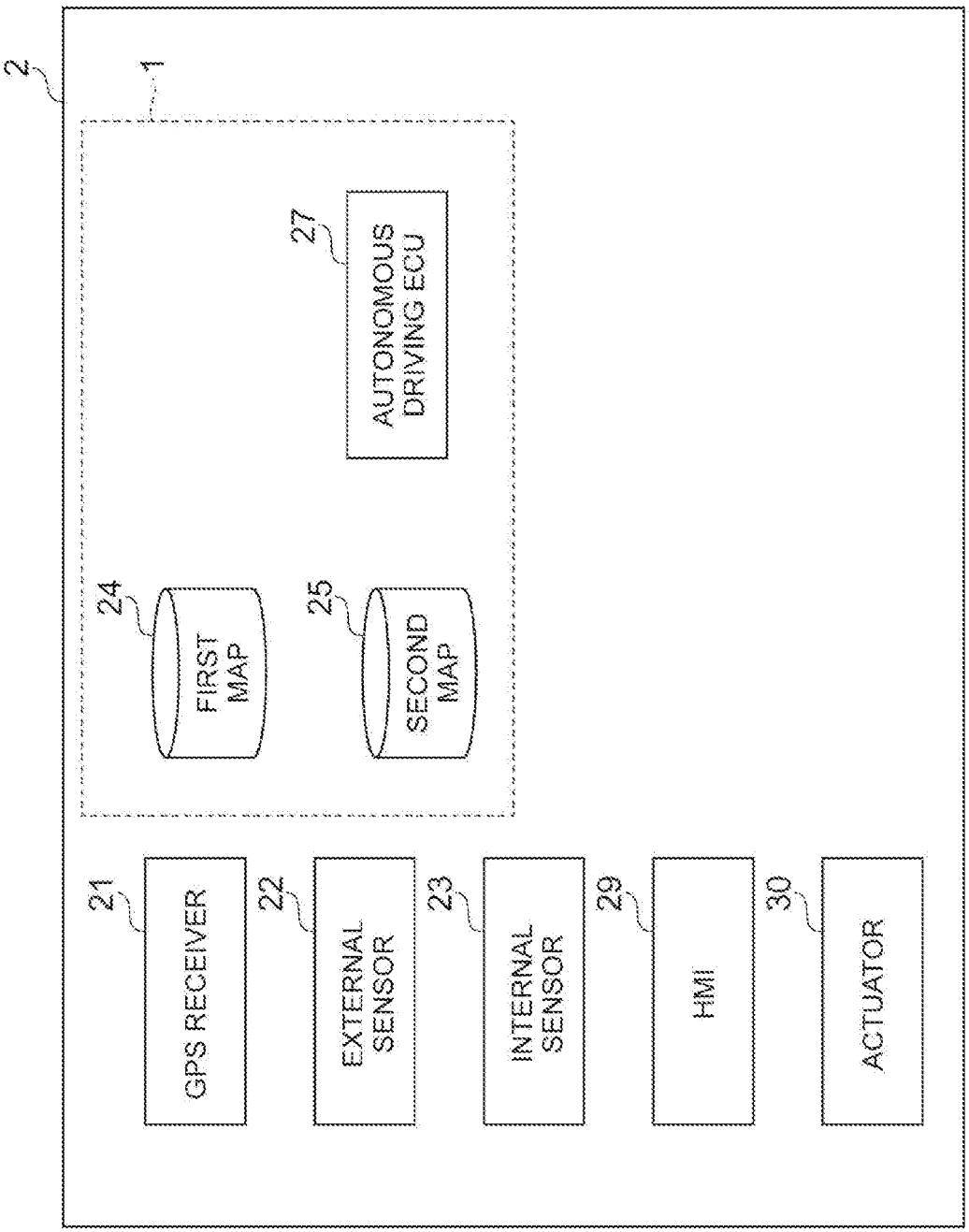
FIG. 1 is a block diagram illustrating an example of a configuration of a vehicle including an autonomous driving device in a first embodiment.

Hereinafter, exemplary embodiments will be described with reference to the drawings. In the following description, the same reference numerals will be given to the same or equivalent elements, and the description thereof will not be repeated.

First Embodiment (Configuration of an Autonomous Driving System) FIG. 1 is a block diagram illustrating an example of a configuration of a vehicle 2 including an autonomous driving device 1 in a first embodiment. As illustrated in FIG. 1, an autonomous driving device 1 is mounted on a vehicle 2 such as a passenger car.

The autonomous driving device 1 performs autonomous driving of the vehicle 2. The autonomous driving is a vehicle control for causing the vehicle 2 to autonomously travel toward a destination set in advance. The destination may be set by an occupant such as a driver or may be automatically set by the autonomous driving device 1. In the autonomous driving, the driver does not need to perform a driving operation and the vehicle 2 autonomously travels.

The vehicle 2 includes a GPS receiver 21, an external sensor 22, an internal sensor 23, a human machine interface (HMI) 29, and an actuator 30.

The GPS receiver 21 measures a position of the vehicle 2 (for example, the latitude and longitude of the vehicle 2) by receiving signals from three or more GPS satellites.

The external sensor 22 is a detection device that detects a surrounding environment of the vehicle 2. The external sensor 22 includes at least one of a camera and a radar sensor. The camera is an imaging device that images the external situation of the vehicle 2. The camera is provided, for example, on the inner side of a windshield of the vehicle 2. The camera may be a monocular camera or may be a stereo camera. The stereo camera has two imaging units that are arranged so as to reproduce a binocular parallax.

The radar sensor is a detection device that detects objects around the vehicle 2 using radio waves (for example, millimeter waves) or light. The radar sensor transmits the radio wave or light to the surroundings of the vehicle 2, and detects the objects by receiving radio waves or light reflected from objects. The radar sensor includes, for example, at least one of millimeter wave radar and a light detection and ranging (LIDAR).

The external sensor 22 may be prepared for each detection target. For example, the external sensor 22 may include a sensor for object detection and a dedicated sensor prepared for detecting a specific object. The dedicated sensor is, for example, a camera for detecting a traffic signal. In that case, the traffic signal and a signal state are detected by template matching using color information (for example luminance) of an image acquired by the camera and/or the shape of the image (for example, using Hough transform).

The internal sensor 23 is a detection device that detects a travel state of the vehicle 2. The internal sensor 23 includes a vehicle speed sensor, an accelerator sensor, and a yaw rate sensor. The vehicle speed sensor is a measuring device that measures a speed of the vehicle 2. As the vehicle speed sensor, for example, a vehicle wheel speed sensor is used, which is provided on vehicle wheels of the vehicle 2 or on a drive shaft rotating integrally with vehicle wheels, and detects a rotational speed of the vehicle wheels.

The accelerator sensor is a measuring device that measures the acceleration of the vehicle 2. The accelerator sensor may include a longitudinal accelerator sensor that measures acceleration in the longitudinal direction of the vehicle 2 and a lateral accelerator sensor that measures a lateral acceleration of the vehicle 2. The yaw rate sensor is a measuring device that measures a yaw rate (rotation angular velocity) around the vertical axis at the center of gravity of the vehicle 2. As the yaw rate sensor, for example, a Gyro sensor can be used.

The HMI 29 is an interface that performs inputting and outputting of the information between the autonomous driving device 1 and the occupants. The HMI 29 includes, for example, a display and a speaker. The HMI 29 outputs an image on the display and outputs a voice from the speaker according to a control signal from the autonomous driving device 1. The display may be a head-up display. As an example, the HMI 29 includes input devices (buttons, a touch panel, a voice input device, or the like) for accepting the input from occupants.

The actuator 30 is a device used for controlling the vehicle 2. The actuator 30 includes at least a throttle actuator, a brake actuator, and a steering actuator.

The throttle actuator controls a driving force of the vehicle 2 by controlling an amount of air (throttle opening degree) supplied to the engine according to the control signal from the autonomous driving device 1. When the vehicle 2 is a hybrid vehicle, in addition to the amount of air supplied to the engine, a control signal from the autonomous driving device 1 is input to a motor as a power source, and the driving force of the vehicle 2 is controlled. When the vehicle 2 is an electric vehicle, a control signal from the autonomous driving device 1 is input to a motor as a power source instead of the throttle actuator, and the driving force of the vehicle 2 is controlled. The motor as the power source in these cases configures the actuator 30.

The brake actuator controls the brake system according to the control signal from the autonomous driving device 1 and controls a braking force applied to the vehicle wheels of the vehicle 2. For example, a hydraulic brake system can be used as the brake system.

The steering actuator controls the driving of the assist motor for controlling the steering torque in the electric power steering system according to the control signal from the autonomous driving device 1. As a result, the steering actuator controls the steering torque of the vehicle 2.

The autonomous driving device 1 includes a first map 24, a second map 25, and an autonomous driving electronic control unit (ECU) 27 (an example of a control unit). The ECU is an electronic control unit including a central processing unit (CPU), read only memory (ROM), random access memory (RAM), and a controller area network (CAN) communication circuit.

The first map 24 and the second map 25 are storage devices that store map information. The first map 24 and the second map 25 are stored, for example, in a hard disk drive (HDD) mounted on the vehicle 2.

Figure 2:
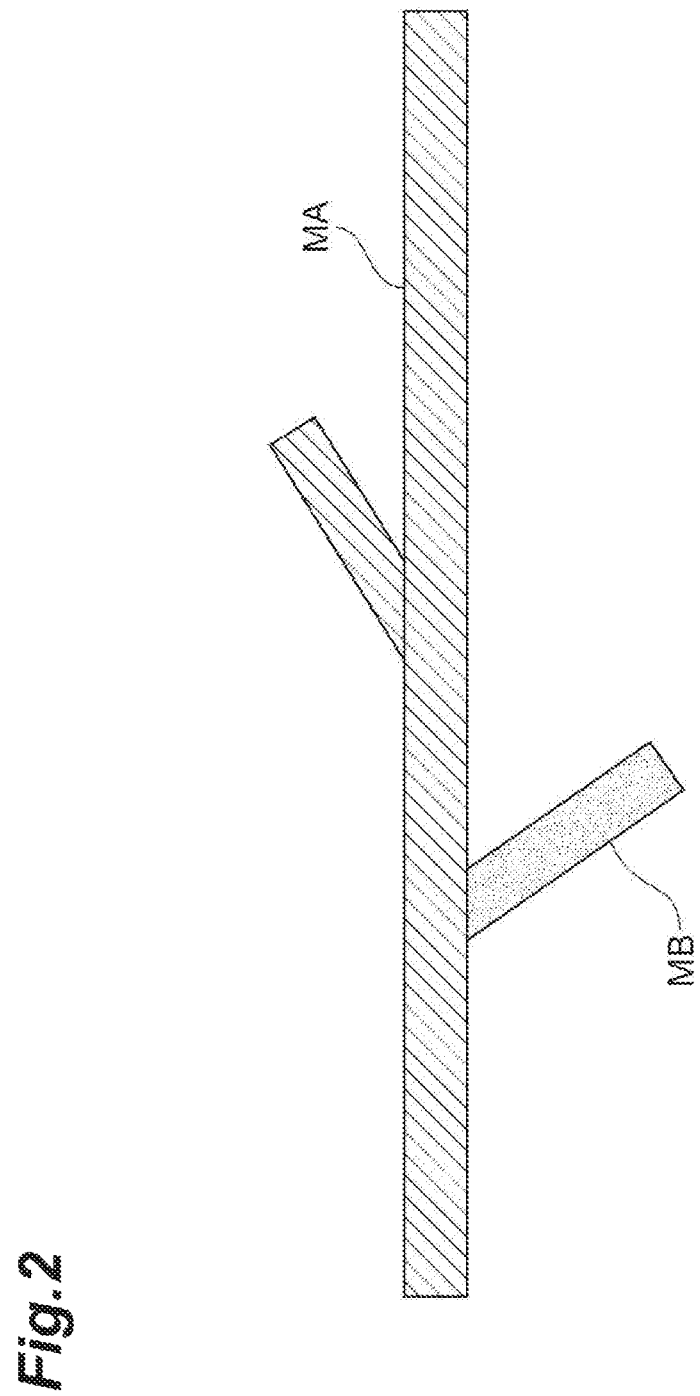
FIG. 2 is a diagram for explaining the recording range of positions in a first map and a second map.

As an example, the first map 24 and the second map 25 are organized such that the recording ranges of the positions do not overlap. FIG. 2 is a diagram for explaining the range of recording the positions of the first map 24 and the second map 25. As illustrated in FIG. 2, the first map 24 records information on a position indicated by a first range MA, and the second map 25 records information on a position indicated by a second range MB.

The first map 24 and the second map 25 record a content. The content is information associated with a position on a map. The content includes, for example, the presence or absence of a stationary object, a content of a traffic rule, a date and time of updating, and the like. The stationary object is an object fixed at a predetermined position on a map and does not move by itself. The stationary objects includes, for example, road surface paints (including lane boundary lines such as white line and yellow line) and structures (curbs, poles, telephone poles, buildings, signs, trees, or the like).

The contents recorded in the first map 24 and the second map 25 are different from each other. Specifically, the recording target stationary objects in the first map 24 and the second map 25 are different from each other. The first map 24 includes the presence or absence information on at least two stationary objects. At least one stationary object out of at least two stationary objects (the first content and the second content) recorded in the first map 24 is a recording target in the second map 25. In addition, the stationary object which is not the recording target in the second map 25 is included in at least two stationary objects (the first content and the second content) recorded in the first map 24.

FIG. 3 is a table for explaining the recording targets in the first map 24 and the second map 25. As illustrated in FIG. 3, the recording target in the first map 24 includes a lane boundary line (an example of the first content), a pole (an example of the second content), a traffic rule such as a speed limit, and date and time of updating. The recording target in the second map 25 includes the lane boundary line, the traffic rule, and the date and time of updating. As described above, the first map 24 is a map in which the lane boundary line and the pole are associated with the position while the second map 25 is a map in which the lane boundary line and the position are associated with each other, but the pole is not the recording target. In the first map 24 and the second map 25, the traffic rule and the date and time of updating may not be included in the recording target, and other information may be the recording target.

FIG. 4A illustrates an example of contents recorded in the first map 24. As illustrated in FIG. 4A, the position on the map and the contents (information on the lane boundary lines, information on the poles, speed limit, and the date and time of updating) are associated with each other. The information on the lane boundary line is information on a line such as a white line or a yellow line painted on the road surface, and is presence or absence information indicating whether or not the lines are present at the position. The presence or absence information is a presence or absence flag indicated, for example, as "1" when the line is present (an example of presence information), and indicated as "0" when the line is not present (an example of information indicating that the line is not present). The information on the poles is presence or absence information indicating whether or not the poles present at the position. The presence or absence information is a presence or absence flag indicated, for example, as "1" when the pole is present (an example of presence information) and indicated as "0" when the pole is not present (an example of information indicating that the pole is not present).

In FIG. 4A, as an example, the position (10, 10) is associated with the lane boundary line (presence or absence flag "0"), the pole (presence or absence flag "1"), the speed limit "60", the date and time of updating "202001010800". That is, it can be understood that a line that becomes a lane boundary line is not present a pole is present, the speed limit is 60 km/h at the position (10, 10) at 08:00 on Jan. 1, 2020. Similarly, in other records, the positions are associated with the contents respectively.

FIG. 4B illustrates an example of contents recorded in the second map 25. As illustrated in FIG. 4B, the position on the map is associated with the contents (information on the lane boundary line, speed limit, and the date and time of updating). The information on the lane boundary line is information on the line such as a white line or a yellow line painted on the road surface, and is presence or absence information indicating whether or not the lines are present at the position. The presence or absence information is a presence or absence flag indicated, for example, as "1" when the line is present (an example of presence information), and indicated as "0" when the line is not present (an example of information indicating that the line is not present).

In FIG. 4B, as an example, the position (10, 10) is associated with the lane boundary line (presence or absence flag "0"), the speed limit "60", the date and time of updating "202002010800". That is, it can be understood that the line which is a lane boundary line is not present and the speed limit is 60 km/h at the position (10, 10) at 08:00 on Feb. 1, 2020. Similarly, in other records, the positions are associated with the contents respectively.

As illustrated in FIG. 4A and FIG. 4B, the presence or absence information on the pole is included in the first map 24 and the presence or absence information on the pole is included in the second map 25. As described above, the stationary objects as the recording targets in the first map 24 and the second map 25 different from each other. The first map 24 and the second map 25 may be stored in a storage device other than the storage device included in the vehicle 2. The first map 24 and the second map 25 may be configured as two-dimensional information or three-dimensional information.

The autonomous driving ECU 27 is hardware for performing the overall management of the autonomous driving, and is a calculation device. The autonomous driving ECU 27 is connected to a network that communicates using, for example, a CAN communication circuit, and is connected so as to be able to communicate with the configuration elements of the vehicle 2 described above. That is, the autonomous driving ECU 27 can refer to the result of measurement by the GPS receiver 21, the results of detection by the external sensor 22 and the internal sensor 23, and the first map 24 and the second map 25. The autonomous driving ECU 27 can refer to the information input to the HMI 29. The autonomous driving ECU 27 can output a signal to the HMI 29 and the actuator 30.

In the autonomous driving ECU 27, for example, various functions of autonomous driving described later are realized by loading a program stored in the ROM into the RAM and executing the program loaded in the RAM by the CPU. The autonomous driving ECU 27 may be configured with a plurality of ECUs.

The autonomous driving ECU 27 acquires the rough position of the vehicle 2 on the map. For example, the autonomous driving ECU 27 acquires the rough position of the vehicle 2 on the map using the position information on the vehicle 2 received by the GPS receiver 21. If the position of the vehicle 2 can be measured by a sensor installed outside such as on the road, the autonomous driving ECU 27 may acquire the rough position of the vehicle 2 on the map by communicating with the sensor. The autonomous driving ECU 27 recognizes the position of the vehicle 2 on the map (localization: estimation of the host vehicle position) based on the result of detection by the external sensor 22 and any one of the first map 24 and the second map 25. The estimation of the host vehicle position is processing for determining the position and orientation of the vehicle 2 on the map in detail and is one of the autonomous driving processing items. For example, the estimation of the host vehicle position is processing for estimating the position and direction of the vehicle 2 in which the position error between the feature detected by the external sensor 22 and the feature stored in the map is the smallest as the current position and direction of the vehicle 2. A result of estimation of the host vehicle position (the position and orientation of the vehicle) is one of the information items necessary for the autonomous driving of the vehicle. The information necessary for the autonomous driving of the vehicle is not limited to the "position and orientation of the vehicle" but may be only the position of the vehicle or only the orientation of the vehicle.

As described above, the first map 24 and the second map 25 are organized such that the recording ranges of the positions do not overlap. The autonomous driving ECU 27 retrieves information corresponding to the rough position of the vehicle 2 on the map from the first map 24 and the second map 25, and acquires the information from any one of the first map 24 and the second map 25. That is, when the map recording the information corresponding to the rough position of the vehicle 2 on the map is the first map 24, the autonomous driving ECU 27 performs the estimation of the host vehicle position using the first map 24. When the map recording the information corresponding to the rough position of the vehicle 2 on the map is the second map 25, the autonomous driving ECU 27 performs the estimation of the host vehicle position using the second map 25.

As an example, it is assumed that the information corresponding to a first position on the map is recorded in the first map 24, and the information corresponding to the first position is not recorded in the second map 25 at all. In addition, it is assumed that information corresponding to a second position on the map is recorded in the second map 25, and the information corresponding to the second position is not recorded in the first map 24 at all.

When the autonomous driving at the first position is performed using the first map 24, the autonomous driving ECU 27 performs the estimation of the position and orientation of the vehicle 2 (an example of the information necessary for the autonomous driving of the vehicle) using the presence information on a plurality of stationary objects corresponding to the first position recorded in the first map 24. For example, the autonomous driving ECU 27 determines the position and orientation of the vehicle 2 using a first method based on the presence information (flag "1") on the lane boundary line and presence information (flag "1") on the pole corresponding to the first position recorded in the first map 24. The first method is a logic for the estimation of the host vehicle position. As a specific example, the first method is a logic for determining the position and orientation of the vehicle 2 such that the position error between the result of detection and the information in the map is the smallest, using the result of detection by the external sensor 22 and the presence information (flag "1") on two stationary objects such as the lane boundary line and the pole.

When the autonomous driving at the second position is performed using the second map 25, the autonomous driving ECU 27 estimates the position and orientation of the vehicle 2 using the same method of logic for the estimation of the host vehicle position (an example of the first method) used in the first map 24. However, since the pole is not the recording target, the information on the presence of the pole (flag "1") necessary for the first method is not recorded in the second map 25. Therefore, even if the autonomous driving ECU 27 refers to the second map 25, the pole information is a "null value".

When estimating the host vehicle position, the autonomous driving ECU 27 treats the pole corresponding to the second position as not present. Specifically, the autonomous driving ECU 27 ignores the pole corresponding to the second position using the information (for example, the presence or absence flag "0") indicating that the pole corresponding to the second position is not present. The autonomous driving ECU 27 may be programmed to return a value "0" when the pole information is needed in the calculation processing for the estimation of the host vehicle position using the second map 25, or the second map 25 may be supplemented with the pole information. FIG. 5 illustrates an example of the second map supplemented with a recorded content. The supplemented second map 250 illustrated in FIG. 5 is a map in which the second map 25 is supplemented with the presence or absence flag "0" as the pole information 251. As described above, for the stationary objects not commonly recorded in the plurality of maps, the autonomous driving ECU 27 uses the information indicating that the stationary object is not present (for example, flag "0") on the map where the stationary object is not set as the recording target, and thus, can adopt the logic for estimating the host vehicle position common to a plurality of maps.

As an example, the autonomous driving ECU 27 recognizes the object (including the position of the object) around the vehicle 2 based on any one of the first map 24 and the second map 25 and the result of detection by the external sensor 22. The objects include stationary objects that do not move such as telephone poles, guardrails, trees, buildings, and moving objects such as pedestrians, bicycles, and other vehicles. For example, the autonomous driving ECU 27 recognizes the objects every time the result of detection is acquired from the external sensor 22. The autonomous driving ECU 27 may recognize the objects using other well-known methods.

As an example, the autonomous driving ECU 27 detects a moving object from the recognized objects using the information on the stationary objects included in any one of the first map 24 and the second map 25. The autonomous driving ECU 27 may detect the moving objects using other well-known methods.

The autonomous driving ECU 27 applies a Kalman filter, a particle filter, and the like to the detected moving objects to measure an amount of movement of the moving objects at that time point. The amount of movement includes the moving direction and the moving speed of the moving object. The amount of movement may include a rotational speed of the moving object. In addition, the autonomous driving ECU 27 may perform an error estimation on the amount of movement.

The autonomous driving ECU 27 may specify the type of the moving object using image recognition processing by the camera (processing for comparing the moving object with the image model of the object) or the like. When the type of the moving object can be specified, the autonomous driving ECU 27 corrects the amount of movement and the movement error of the moving object based on the type of the moving object.

The moving objects may include or may not include other parked vehicles, stopped pedestrians, and the like. The moving direction of another vehicle whose speed is zero can be estimated, for example, by detecting the front of the vehicle using image processing by the camera. Similarly, the moving direction of the stopped pedestrian can be estimated by detecting the orientation of the face.

The autonomous driving ECU 27 recognizes the travel state of the vehicle 2 based on the result of detection by the internal sensor 23 (for example, vehicle speed information from the vehicle speed sensor, acceleration information from the accelerator sensor, yaw rate information from the yaw rate sensor, and the like). The travel state of the vehicle 2 includes, for example, the vehicle speed, the acceleration, and the yaw rate.

The autonomous driving ECU 27 recognizes the boundary lines of the lane in which the vehicle 2 travels based on the result of detection by the external sensor 22.

The autonomous driving ECU 27 generates the trajectory of the vehicle 2 based on the result of detection by the external sensor 22, the first map 24 and the second map 25, the position of the recognized vehicle 2 on the map, the information on the recognized object (including the boundary lines) and the recognized travel state of the vehicle 2. At this time, the autonomous driving ECU 27 generates the trajectory of the vehicle 2 on the assumption of the behavior of the object around the vehicle 2. Examples of the assumption of the behavior of the objects include the assumption that all the objects around the vehicle 2 are the stationary objects, the assumption that the moving objects are supposed to move independently, and the assumption that the moving objects are moving while interacting with at least one of another object and the vehicle 2.

The autonomous driving ECU 27 generates the trajectory candidates for a plurality of vehicles 2 using a plurality of assumptions. The trajectory candidates include at least one trajectory where the vehicle 2 travels while avoiding the object. The autonomous driving ECU 27 selects one trajectory using the reliability of each of the trajectory candidates or the like.

The autonomous driving ECU 27 generates a travel plan corresponding to the selected trajectory. The autonomous driving ECU 27 generates the travel plan corresponding to the trajectory of the vehicle 2 based on the result of detection by the external sensor 22, the first map 24, and the second map 25. The autonomous driving ECU 27 generates the travel plan within a range not exceeding the speed limit in the traveling lane using the speed limit stored in the first map 24 and the second map 25. In addition, the autonomous driving ECU 27 generates a travel plan in which the vehicle 2 travels within a range not exceeding a predetermined upper limit speed.

The autonomous driving ECU 27 outputs a travel plan to be generated as a combination of a pair of two elements that are a target position p in a coordinate system in which the in which the trajectory of the vehicle 2 is fixed to the vehicle 2 and a speed V at each target point, that is, a plurality of configuration coordinates (p, V). Here, each target position p has at least the position of the x coordinate, y coordinate in the coordinate system fixed to the vehicle 2 and information equivalent thereto. The travel plan is not particularly limited as long as the travel plan describes the behavior of the vehicle 2. In travel plan, for example, a target time t may be used, or the target time t and the orientation of the vehicle 2 at that time may be added instead of the speed V. The travel plan may be data indicating the trends of the vehicle speed, the acceleration or deceleration, the steering torque, or the like of the vehicle 2 when the vehicle 2 travels on the trajectory. The travel plan may include the speed pattern, acceleration or deceleration pattern and the steering pattern of the vehicle 2.

The autonomous driving ECU 27 automatically controls the traveling of the vehicle 2 based on the generated travel plan. The autonomous driving ECU 27 outputs a control signal corresponding to the travel plan to the actuator 30. In this way, the autonomous driving ECU 27 controls the travel of the vehicle 2 so that the vehicle 2 autonomously travels based on the travel plan. The autonomous driving ECU 27 can perform the autonomous driving of the vehicle 2 using a well-known method.

(Operation of the Autonomous Driving Device)

Figure 6:
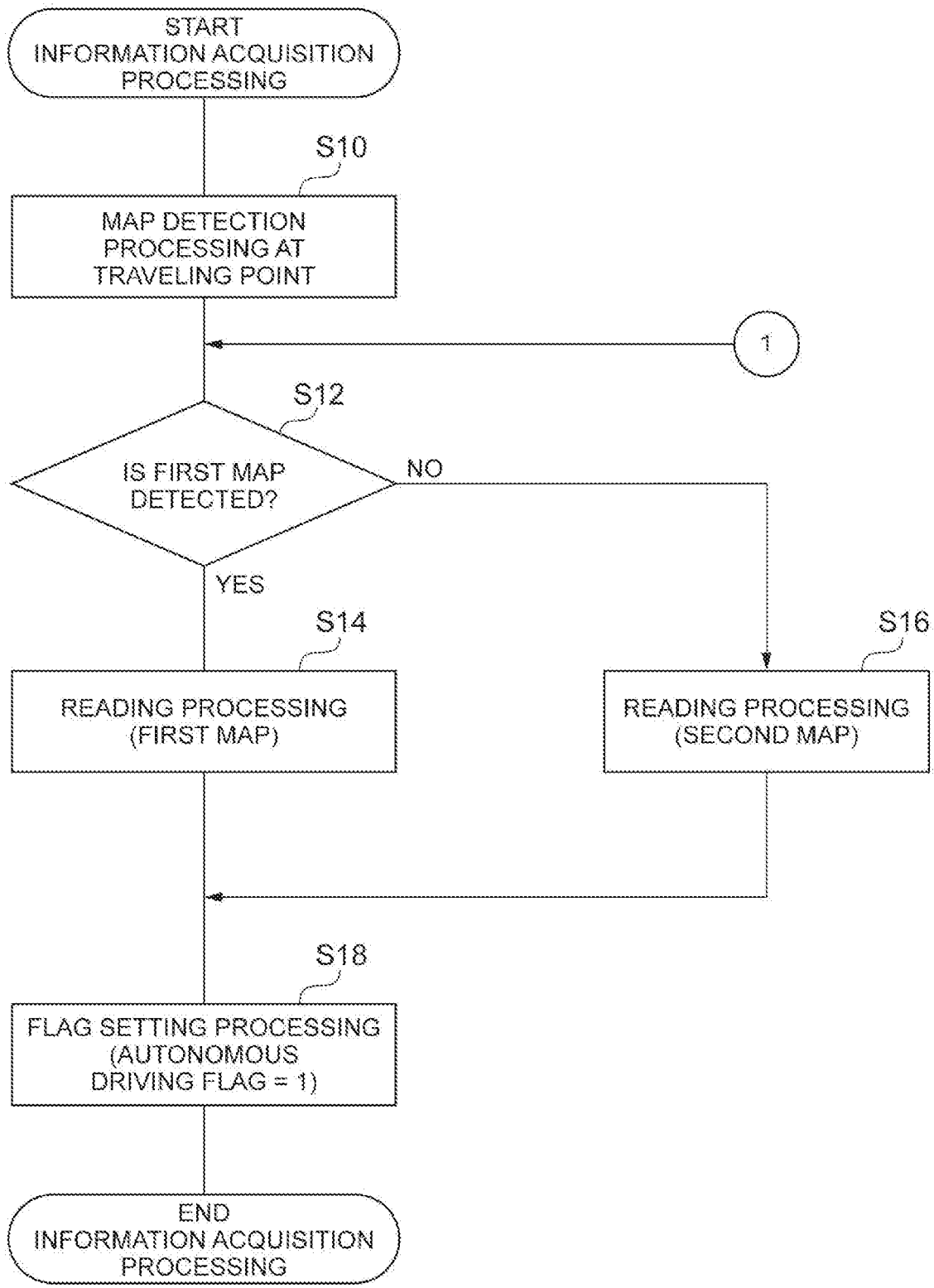
FIG. 6 is a flowchart illustrating an example of information acquisition processing.

Hereinafter, an example of an autonomous driving method will be disclosed. FIG. 6 is a flowchart illustrating an example of information acquisition processing. For example, the flowchart in FIG. 6 is executed by the autonomous driving device 1 at the timing when the ON-operation of the autonomous driving function by the driver of the vehicle 2 is received.

As illustrated in FIG. 6, as map detection processing (S10), the autonomous driving ECU 27 of the autonomous driving device 1 detects a map corresponding to the traveling point of the vehicle 2. For example, the autonomous driving ECU 27 detects one of the first map 24 and the second map 25 based on the position information of the vehicle 2 received by the GPS receiver 21.

Subsequently, as determination processing (S12), the autonomous driving ECU 27 determines whether or not the map detected in the map detection processing (S10) is the first map 24.

When it is determined that the detected map is the first map 24 (YES in S12), as reading processing (S14), the autonomous driving ECU 27 reads the information from the first map 24. On the other hand, when it is determined that the detected map is not the first map 24 (NO in S12), as the reading process (S16), the autonomous driving ECU 27 reads the information from the second map 25.

When the reading processing (S14) or the reading processing (S16) is completed, as flag setting processing (S18), the autonomous driving ECU 27 sets the autonomous driving flag to "1". The autonomous driving flag is a flag for determining whether or not to start the autonomous driving processing. The autonomous driving flag is initialized to "0" at the start time of the flowchart in FIG. 6. When the flag setting processing (S18) is completed, the autonomous driving ECU 27 ends the flowchart illustrated in FIG. 6. As described above, the autonomous driving ECU 27 is configured to be able to acquire the map recording the traveling position when using the first map 24 and the second map 25 which are organized such that the recording ranges of the positions do not overlap. The flowchart illustrated in FIG. 6 can be executed again at the timing when the travel plan is generated again.

Figure 7:
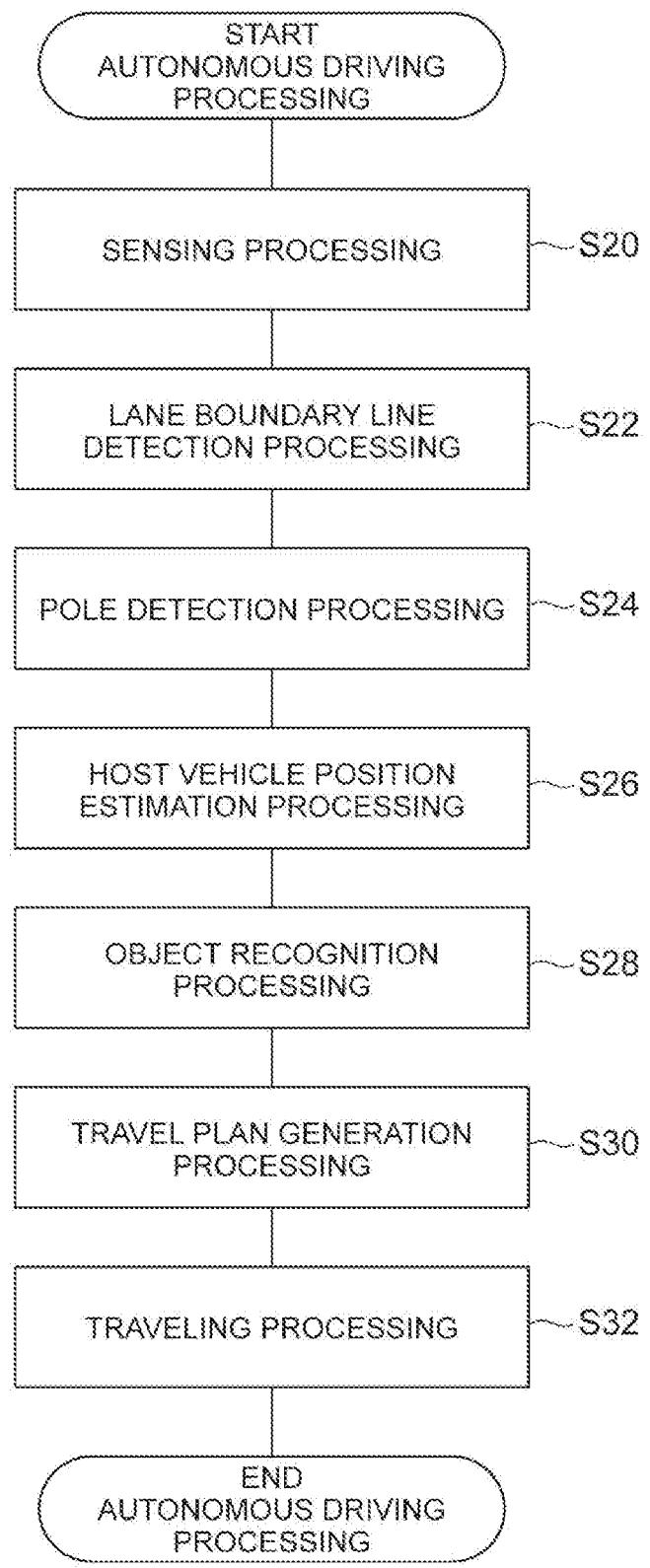
FIG. 7 is a flowchart illustrating an example of autonomous driving processing.

FIG. 7 is a flowchart illustrating an example of the autonomous driving processing. For example, the flowchart illustrated in FIG. 7 is executed by the autonomous driving device 1 at the timing when the autonomous driving flag is set to "1" in the flag setting processing (S18) in FIG. 6.

As illustrated in FIG. 7, as sensing processing (S20), the autonomous driving ECU 27 of the autonomous driving device 1 acquires the result of detection by the external sensor 22 sensing the surroundings of the vehicle 2. Subsequently, as lane boundary line detection processing (S22), the autonomous driving ECU 27 detects the lane boundary line based on the result of detection by the external sensor 22 obtained in the sensing processing (S20). When the external sensor 22 has not detected the lane boundary line, the autonomous driving ECU 27 recognizes that the lane boundary line is not present around the vehicle 2. Subsequently, as pole detection processing (S24), the autonomous driving ECU 27 detects the pole based on the result of detection by the external sensor 22 acquired in the sensing processing (S20). When the external sensor 22 has not detected the pole, the autonomous driving ECU 27 recognizes that the pole is not present around the vehicle 2.

Subsequently, as host vehicle position estimation processing (S26), the autonomous driving ECU 27 estimates the position and orientation of the vehicle 2 using the first method. The autonomous driving ECU 27 estimates the position and orientation of the vehicle 2 based on the lane boundary line detected in the lane boundary line detection processing (S22), the pole detected in the pole detection processing (S24), and the map (the first map 24 or the second map 25) in which the traveling point is recorded.

When the map in which the traveling point is recorded is the first map 24, the autonomous driving ECU 27 estimates the position and orientation of the vehicle 2 based on the lane boundary line detected in the lane boundary line detection processing (S22), the pole detected in the pole detection processing (S24), the presence information (presence or absence flag "1") of the lane boundary line and the presence information (presence or absence flag "1") of the pole corresponding to the traveling point recorded in the first map 24.

When the map in which the traveling point is recorded is the second map 25, the autonomous driving ECU 27 estimates the position and orientation of the vehicle 2 based on the lane boundary line detected in the lane boundary line detection processing (S22), the pole detected in the pole detection processing (S24), the presence information (presence or absence flag "1") of the lane boundary line corresponding to the traveling point recorded in the second map 25, and the information (presence or absence flag "0") indicating that the pole corresponding to the traveling point recorded in the second map 25 is not present. In this way, even if the pole is detected in the pole detection processing (S24), since it is indicated that no pole is present in the second map 25, the position and orientation of the vehicle 2 is not estimated based on the pole. That is, when the host vehicle position estimation processing (S26) is performed using the second map 25, regardless of the result of pole detection processing (S24), the pole is treated as not being present.

Subsequently, as object recognition processing (S28), the autonomous driving ECU 27 recognizes the object (including the position of the object) around the vehicle 2 based on the result of detection by the external sensor 22 acquired in the sensing processing (S20) and one of the first map 24 and the second map 25. The autonomous driving ECU 27 determines whether the object detected by the external sensor 22 is a moving object or a stationary object based on the information on the stationary object included in the map.

Subsequently, as travel plan generation processing (S30), the autonomous driving ECU 27 generates the trajectory of the vehicle 2 based on the result of detection performed by the external sensor 22 acquired in the sensing processing (S20), the first map 24 and the second map 25, the position of the recognized vehicle 2 on the map, the information on the recognized object (including the boundary line), the recognized travel state of the vehicle 2, and the like. The autonomous driving ECU 27 generates the travel plan along the trajectory.

Subsequently, as traveling processing (S32), the autonomous driving ECU 27 causes the vehicle 2 to travel in accordance with the travel plan generated in the travel plan generation processing (S30).

When the traveling processing (S32) is completed, the autonomous driving device 1 ends the flowchart illustrated in FIG. 7. The autonomous driving device 1 can execute the flowchart again at the timing when the travel plan is generated again and at the timing when the flow chart shown in FIG. 6 ends.

Operational Effects of the First Embodiment

In the autonomous driving device 1 according to the first embodiment, when using the first map 24 in which the pole and the lane boundary lines are recorded as the recording target, the position and orientation of the vehicle 2 is determined by the logic for the estimation of the host vehicle position using the pole and the lane boundary lines, and when using the second map 25 in which the pole is not recorded as the recording target, the position and orientation of the vehicle 2 is determined by the same logic for the estimation of the host vehicle position based on the presence information (presence or absence flag "1") of the lane boundary line corresponding to the second position recorded in the map 25, and the information (presence or absence flag "0") indicating that the pole corresponding to the second position recorded in the second map 25 is not present. When the pole is not recorded as the recording target, the information on the poles is generally a so-called null value. The autonomous driving device 1 can regard that the pole is not present by adopting the information indicating that the pole is not present (for example, the presence or absence flag "0") as the information on the poles. In this way, the autonomous driving device 1 can use the logic for estimation of the host vehicle position under the assumption that the pole is present even when using the map in which the pole is not recorded as the recording target. Accordingly, the autonomous driving device 1 can acquire the position and orientation of the vehicle 2 from a plurality of maps in which the recording targets are different from each other using the same method.

Second Embodiment

A configuration of an autonomous driving device 1A in a second embodiment is different from the autonomous driving device 1 in the first embodiment in the points that the range of recording the positions in a first map 24A and a second map 25A are different, that a map ECU 26 is included, and that a part of the functions of the, autonomous driving ECU 27A is different compared to the autonomous driving device 1 in the first embodiment, and other configurations are the same. The overlapping descriptions will not be repeated below.

Figure 8:
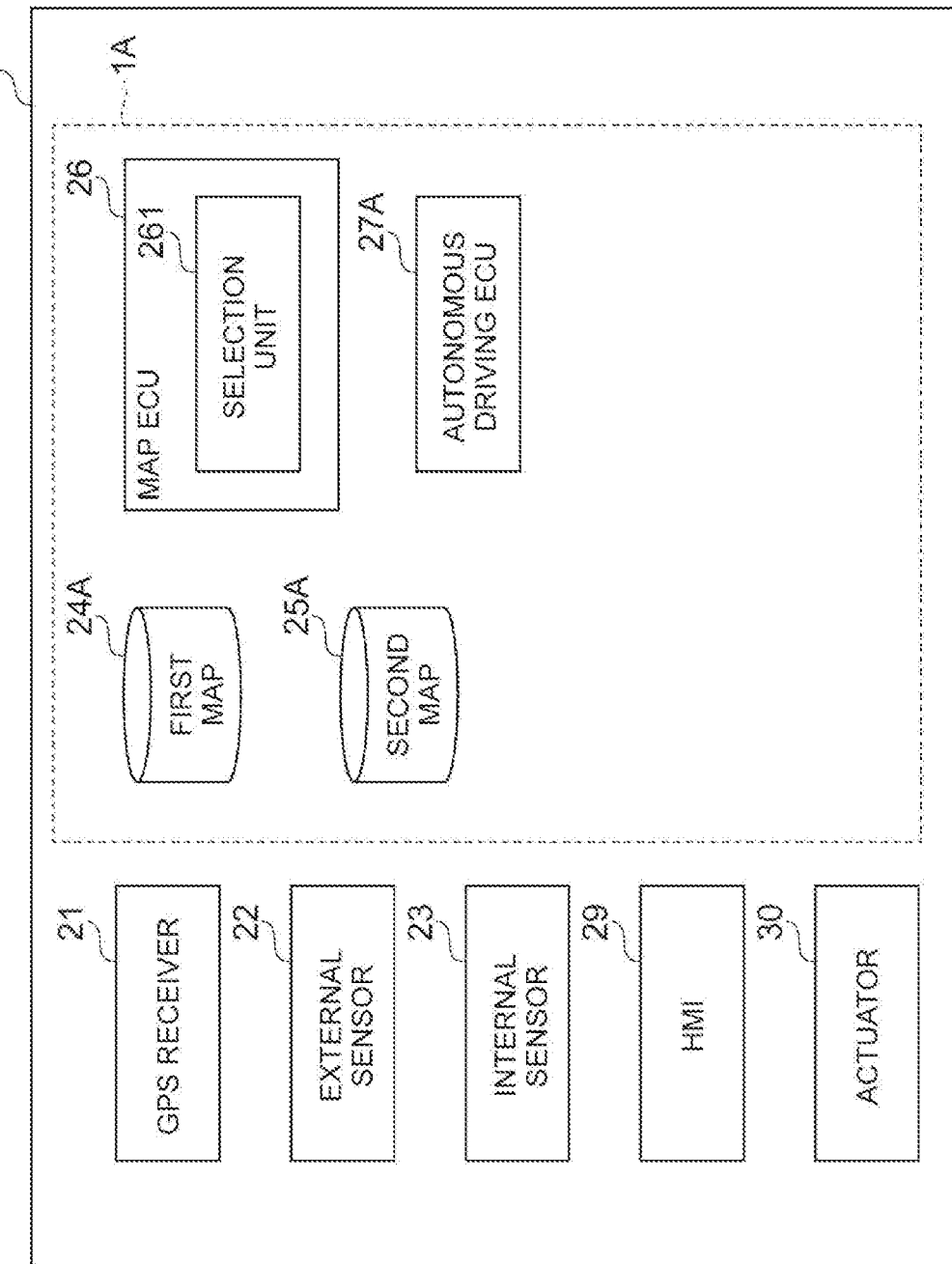
FIG. 8 is a block diagram illustrating an example of a configuration of a vehicle including an autonomous driving device in a second embodiment.

FIG. 8 is a block diagram illustrating an example of the configuration of the vehicle 2 including the autonomous driving device 1A in the second embodiment. As illustrated in FIG. 8, the autonomous driving device 1A includes the first map 24A, the second map 25A, the map ECU 26, and an autonomous driving ECU 27A.

The first map 24A and the second map 25A differ from the first map 24 and the second map 25 in a point that the ranges of recording the positions overlaps, and others are the same. In other words, the first map 24A and the second map 25A are not organized such that the ranges of recording the positions do not overlap.

Figure 9:
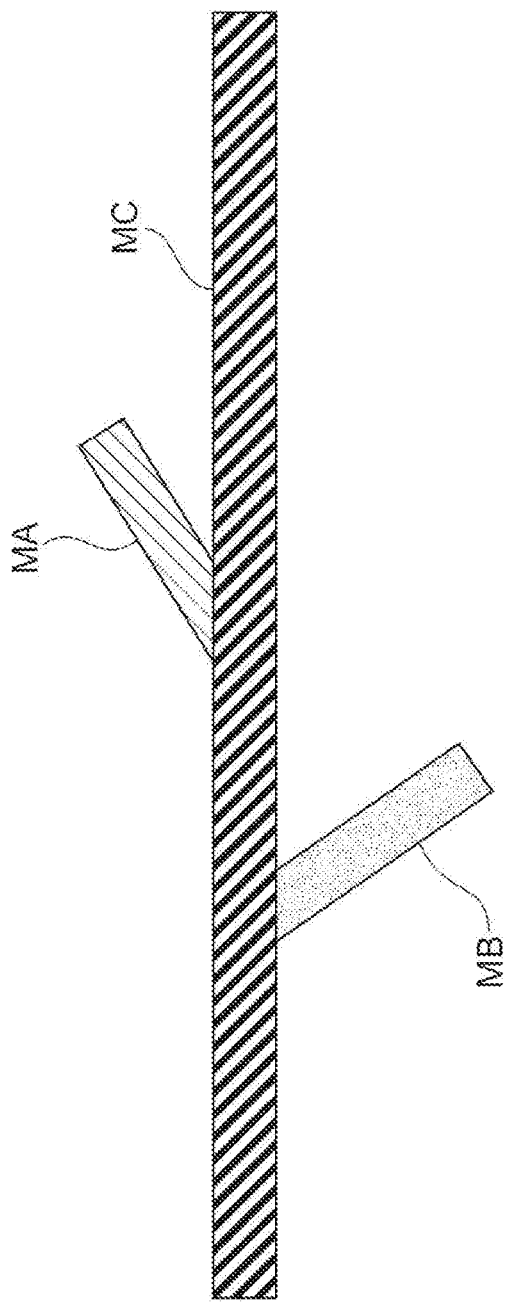
FIG. 9 is a diagram for explaining the recording range of positions in the first map and the second map.

FIG. 9 is a diagram for explaining the range of recording the positions in the first map 24A and the second map 25A. As illustrated in FIG. 9, the first map 24A records information on the position indicated by the first range MA and the third range MC and the second map 25 records information on the position indicated by the second range MB and the third range MC. That is, the third range MC is recorded in both the first map 24A and the second map 25A. In the first embodiment, the information corresponding to the first position on the map is recorded in the first map 24, and the information corresponding to the first position is not recorded in the second map 25 at all. In addition, the information corresponding to the second position on the map is recorded in the second map 25, and the information corresponding to the second position is not recorded in the first map 24 at all. In contrast, in the second embodiment, the information corresponding to the first position and the second position on the map may be included in the first map 24A and the second map 25A. That is, in the concept of present embodiment, the first position and the second position described in the first embodiment include the same position.

The map ECU 26 is hardware for managing the map, and is a calculation device. The map ECU 26 is connected to a network that performs communications using the CAN communication circuit, and is connected to the configuration elements of the vehicle 2 described above so as to be able to communicate with. For example, the map ECU 26 loads a program stored in the ROM into the RAM, and realizes the functions described later by executing the program loaded in the RAM by the CPU. The map ECU 26 may be configured with a plurality of ECUs.

Functionally, the map ECU 26 includes a selection unit 261. The selection unit 261 selects any one of the first map 24 or the second map 25 based on a predetermined condition when the information on the traveling point is recorded in both the first map 24 and the second map 25. The predetermined condition is a guideline set in advance which is a reference for selecting the map. Details of the predetermined condition will be described later.

The autonomous driving ECU 27A differs from the autonomous driving ECU 27 in a point that the autonomous driving is performed using the map selected by the selection unit 261, and others are the same. Other configuration of vehicle 2 is the same as those in the first embodiment.

(Operation of the Autonomous Driving Device)

Figure 10:
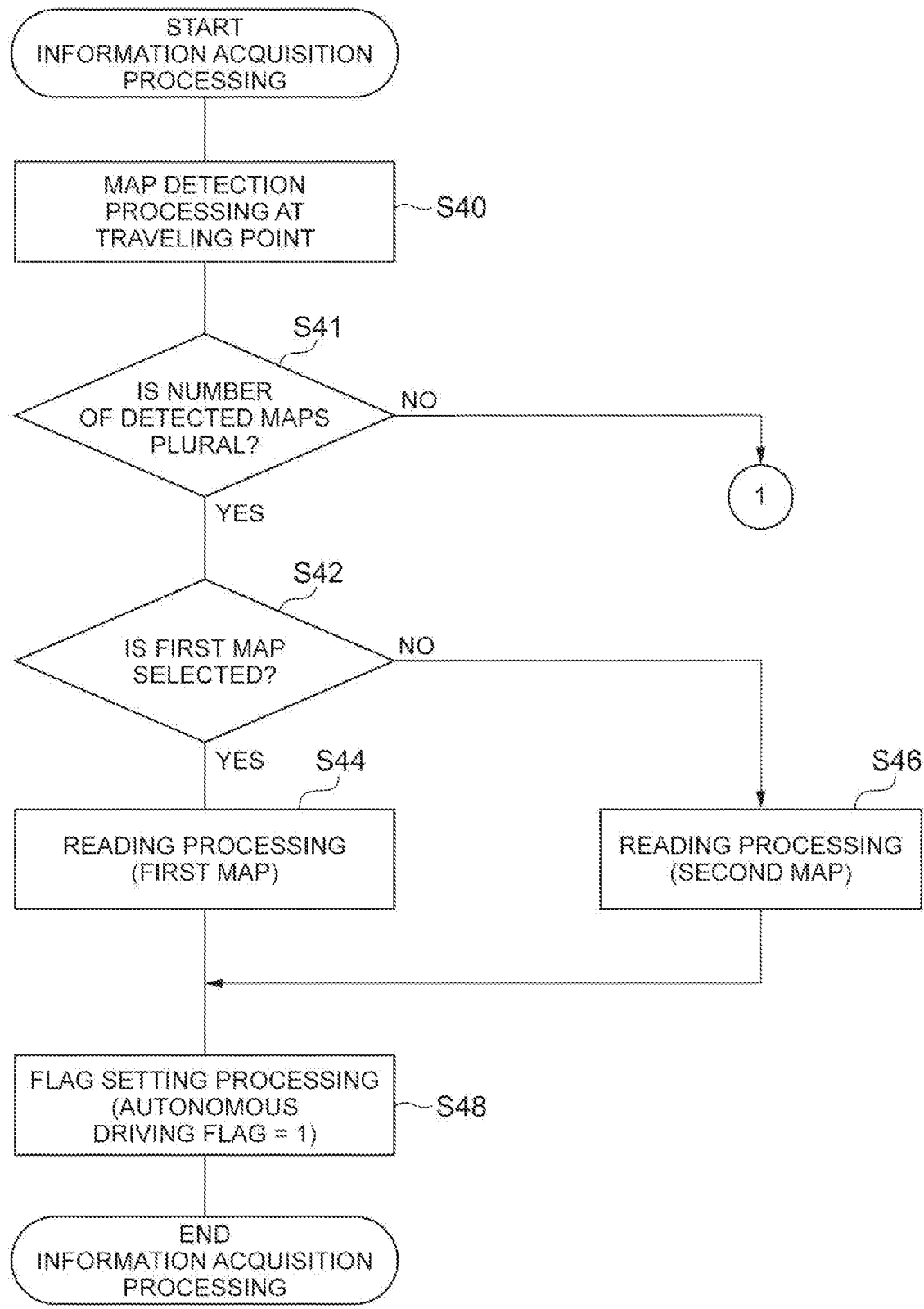
FIG. 10 is a flowchart illustrating an example of information acquisition processing.

Hereinafter, an example of an autonomous driving method will be disclosed. FIG. 10 is a flowchart illustrating an example of information acquisition processing. For example, the flowchart in FIG. 10 is executed by the autonomous driving device 1A at the timing when the ON-operation of the autonomous driving function by the driver of the vehicle 2 is received.

As illustrated in FIG. 10, as map detection processing (S40), the autonomous driving ECU 27A of the autonomous driving device 1A detects a map corresponding to the traveling point of the vehicle 2. For example, the autonomous driving ECU 27A detects the map corresponding to the traveling point of the vehicle 2 based on the position information of the vehicle 2 received by the GPS receiver 21.

Subsequently, as determination processing (S41), the autonomous driving ECU 27A determines whether or not the number of maps detected in the map detection processing (S40) is plural. For example, when the traveling point is included in the third range MC in FIG. 9, the number of detected maps is plural.

When it is determined that the number of detected maps is plural (YES in S41), as selection determination processing (S42), the selection unit 261 of the autonomous driving ECU 27A selects one map from a plurality of maps based on the predetermined condition. As the selection determination processing (S42), the autonomous driving ECU 27A determines whether or not the selected map is the first map 24A.

When it is determined that the detected map is the first map 24A (YES in S42), as reading processing (S44), the autonomous driving ECU 27A reads the information from the first map 24A. On the other hand. When it is determined that the detected map is not the first map 24A (NO in S42), as the reading process (S46), the autonomous driving ECU 27A reads the information from the second map 25A.

When the reading processing (S44) or the reading processing (S46) is completed, as flag setting processing (S48), the autonomous driving ECU 27A sets the autonomous driving flag to "1". The autonomous driving flag is a flag for determining whether or not to start the autonomous driving processing. The autonomous driving flag is initialized to "0" at the start time of the flowchart in FIG. 10. When the flag setting processing (S48) is completed, the autonomous driving ECU 27A ends the flowchart illustrated in FIG. 10.

On the other hand, when it is determined that the number of detected maps is not plural (NO in S41), the autonomous driving ECU 27A executes the determination processing (S12) illustrated in FIG. 6. The subsequent processing is the same as that described with reference to FIG. 6.

As described above, the autonomous driving ECU 27A is configured to be able to select one map when the first map 24A and the second map 25A in which the ranges of recording the positions overlap are used. The flowchart illustrated in FIG. 10 can be executed again at the timing when the travel plan is generated again. The autonomous driving processing executed when the autonomous driving flag is "1" is the same as that in FIG. 7.

(Details of the Predetermined Condition in the Selection Processing)

An example of the predetermined condition relates to the date and time of updating the map. Between the first map 24A and the second map 25A, the selection unit 261 selects the map of which the date and time of updating is new. The date and time of updating the map coincide with the latest date and time of updating among the date and time of updating of contents. Alternatively, between the first map 24A and the second map 25A, the selection unit 261 may select the map of which the date and time of updating the contents corresponding to the traveling point is new.

In addition, the map may store the number of updates. In this case, between the first map 24A and the second map 25A, the selection unit 261 may select the map of which the number of updates is large. Alternatively, between the first map 24A and the second map 25A, the selection unit 261 may select the map of which the number of updates of the contents corresponding to the traveling point is large.

Operational Effects of the Second Embodiment

According to the autonomous driving device 1A in the second embodiment, it is possible to perform the autonomous driving of the vehicle 2 using one map selected from a plurality of maps. The autonomous driving device 1A can also perform the autonomous driving of the vehicle 2 using a map of which the date and time of updating is new, or a map having a high update frequency.

Third Embodiment

A configuration of an autonomous driving device 1B in a third embodiment is different from the autonomous driving device 1A in the second embodiment in the points that a part of functions of the selection unit 261B are different, and that a map ECU 26B includes a measuring unit 262 and a determination unit 263, and other configurations are the same. The overlapping descriptions will not be repeated below.

Figure 11:
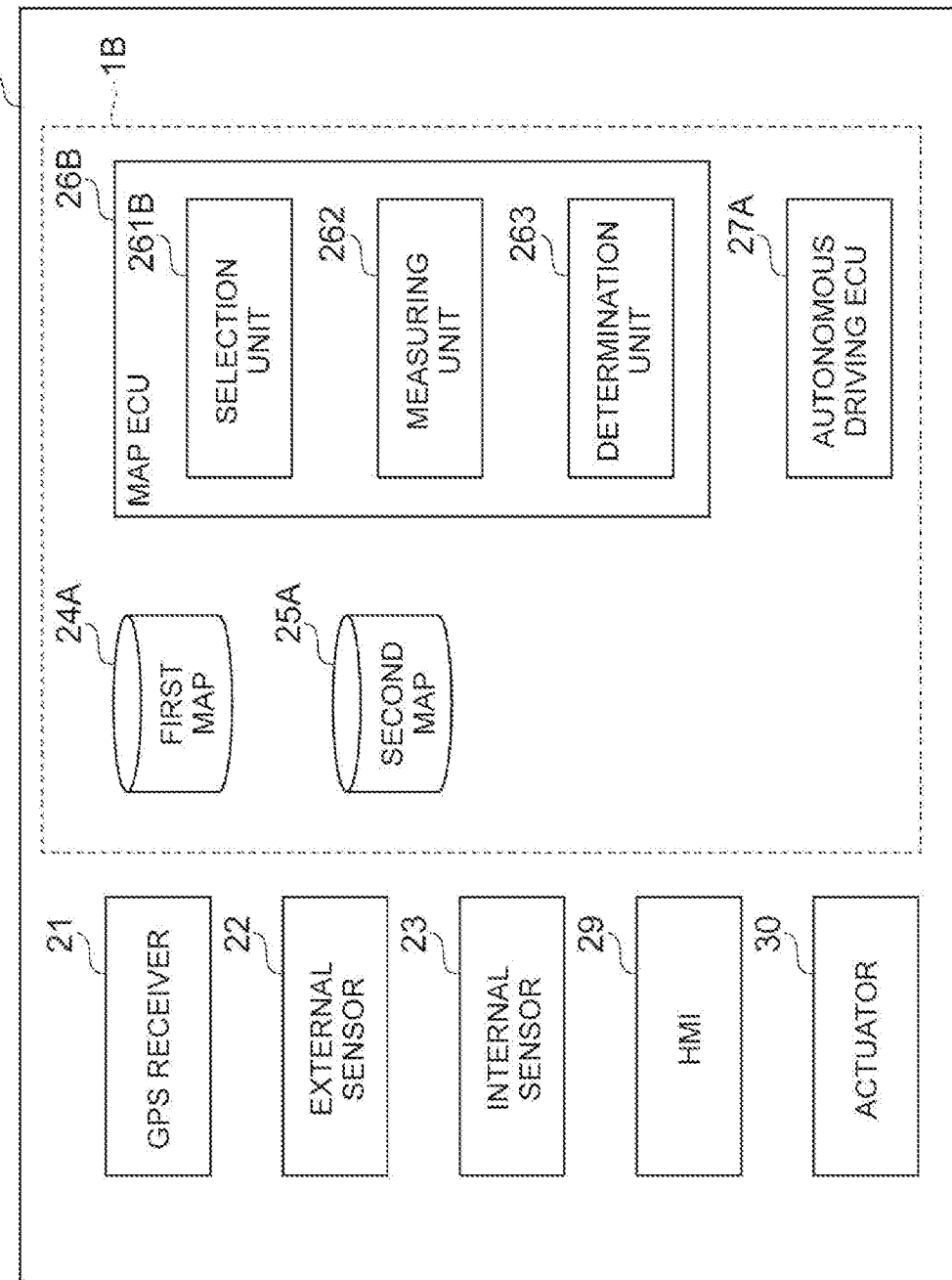
FIG. 11 is a block diagram illustrating an example of a configuration of a vehicle including an autonomous driving device in a third embodiment.

FIG. 11 is a block diagram illustrating an example of the configuration of the vehicle 2 including the autonomous driving device 1B in the third embodiment. As illustrated in FIG. 11, the autonomous driving device 1B includes the first map 24A, the second map 25A, the map ECU 26B, and the autonomous driving ECU 27A.

The map ECU 26B is the same as the map ECU 26 as hardware. Functionally, the map ECU 26B includes the selection unit 261B, the measuring unit 262, and the determination unit 263.

The measuring unit 262 measures a position of the vehicle 2 via communication. The measuring unit 262 measures the position of the vehicle 2 using, for example, the GPS receiver 21. The determination unit 263 determines a scheduled traveling section in the first map 24A and the second map 25A based on the position of the vehicle 2 measured by the measuring unit 262. The scheduled traveling section is a section scheduled to travel from the position of the vehicle 2 to a position separated by a predetermined distance. When the destination is set by the driver, the determination unit 263 sets an end point on the route from the position of the vehicle 2 to the destination and sets the section from the position of the vehicle 2 to the end point as the scheduled traveling section. When the destination is not set, the determination unit 263 sets the end point on the current traveling route while maintaining the current lane, and sets the section from the position of the vehicle 2 to the end point as the scheduled traveling section.

The selection unit 261B is different from the selection unit 261 in the logic of selecting the map. Specifically, the selection unit 261B selects the map under a condition different from the predetermined condition in the second embodiment. An example of the predetermined condition relates to the number of contents recorded in the map. Between the first map 24A and the second map 25A, the selection unit 261B selects a map having a larger number of contents included in the scheduled traveling section. Other configurations of the vehicle 2 are the same as those in the first embodiment.

(Operation of the Autonomous Driving Device)

Figure 12:
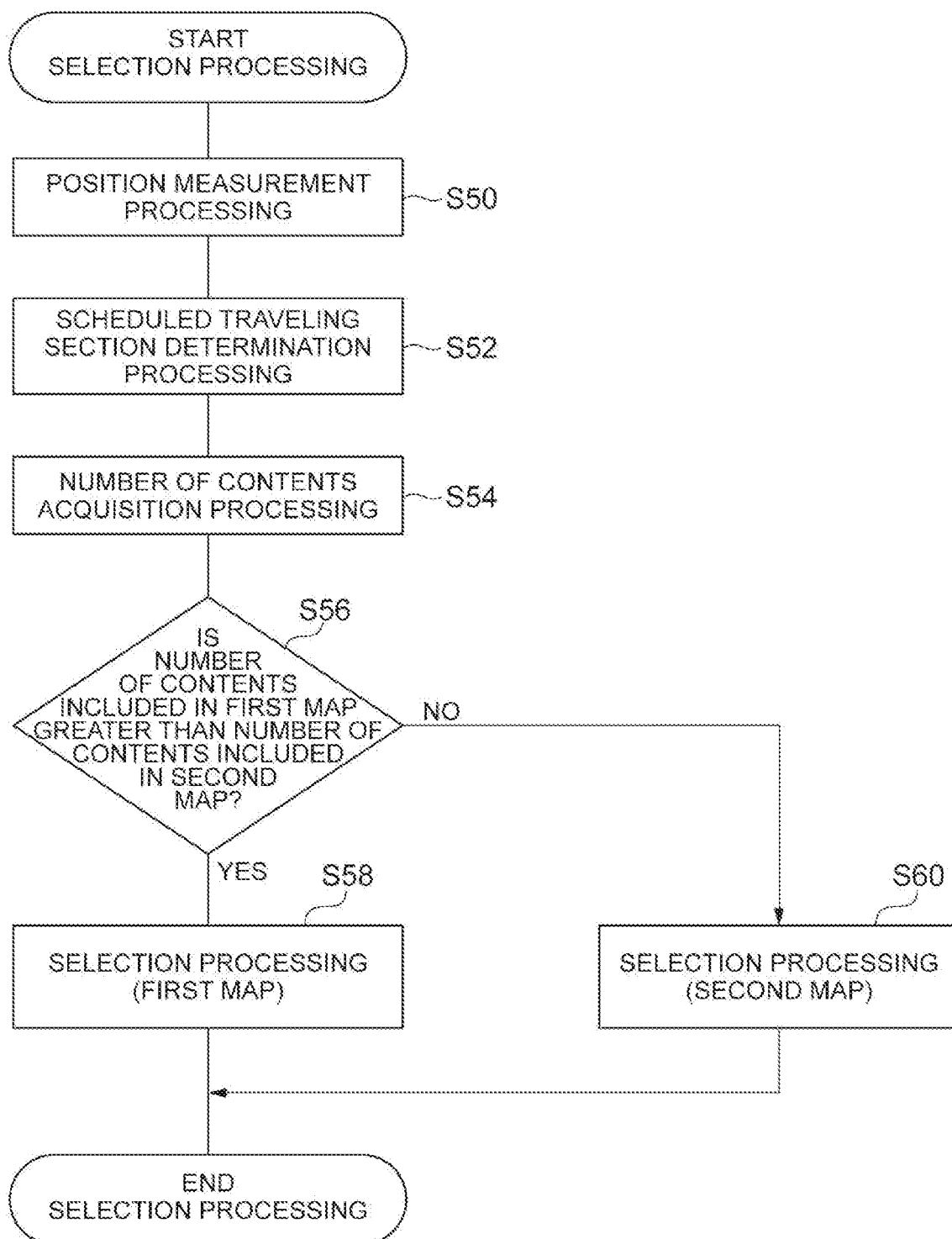
FIG. 12 is a flowchart illustrating an example of selection processing.

Hereinafter, an example of the autonomous driving method will be disclosed. FIG. 12 is a flowchart illustrating an example of selection processing. For example, the flowchart in FIG. 12 is executed by the autonomous driving device 1B when the vehicle 2 travels the position which is set as a recording target in a plurality of maps.

As illustrated in FIG. 12, as position measurement processing (S50), the measuring unit 262 of the autonomous driving device 1B measures the position of the vehicle 2. As an example, the measuring unit 262 measures the position of the vehicle 2 using the GPS receiver 21.

Subsequently, as scheduled traveling section determination processing (S52), the determination unit 263 of the autonomous driving device 1B sets the scheduled traveling section based on the position of the vehicle 2 measured in the position measurement processing (S50).

Subsequently, as number of contents acquisition processing (S54), the selection unit 261B of the autonomous driving device 1B acquires the number of contents included in the scheduled traveling section in the first map 24A and the number of contents included in the scheduled traveling section in the second map 25A.

Subsequently, as determination processing (S56), the selection unit 261B determines whether or not the number of contents included in the scheduled traveling section in the first map 24A is greater than the number of contents included in the scheduled traveling section in the second map 25A.

When it is determined that the number of contents included in the scheduled traveling section in the first map 24A is greater than the number of contents included in the scheduled traveling section in the second map 25A (YES in S56), the selection unit 261B selects the first map 24A as a map to be used for autonomous driving as the selection processing (S58). On the other hand, when the number of contents included in the scheduled traveling section in the first map 24A is not greater than the number of contents included in the scheduled traveling section in the second map 25A (NO in S56), the selection unit 261B selects the second map 25A as a map to be used for autonomous driving as the selection processing (S60).

When the selection processing (S58) or the selection processing (S60) is completed, the autonomous driving device 1B ends the flowchart illustrated in FIG. 12. As described above, the autonomous driving device 1B is configured to be able to select one map with the number of recorded contents as a condition when the first map 24A and the second map 25A in which the ranges of recording the positions overlap are used. The flowchart illustrated in FIG. 12 can be executed again at the timing when the travel plan is generated again. The autonomous driving processing subsequently performed is the same as that in FIG. 7.

Modification Example of the Third Embodiment

Figure 13:
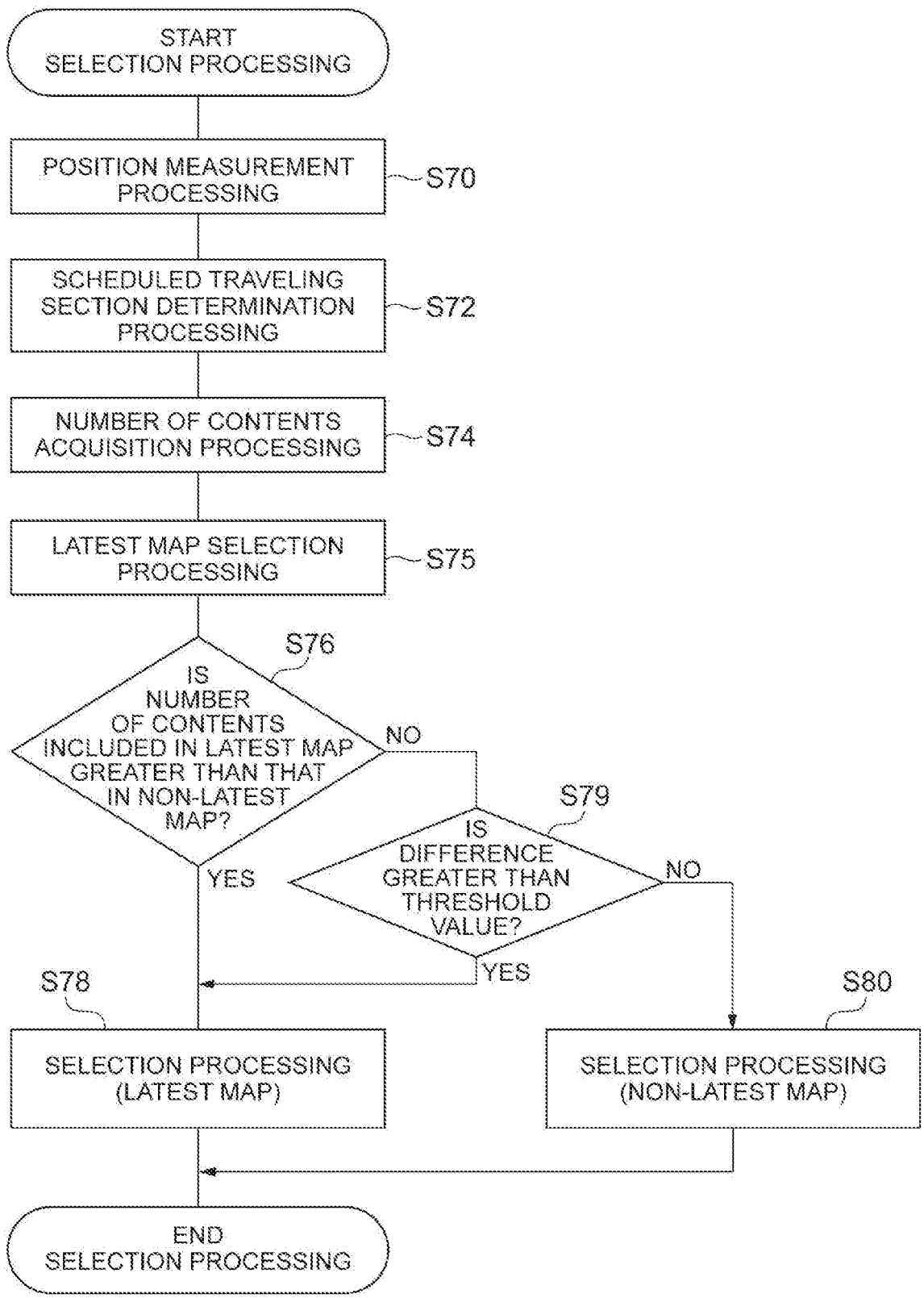
FIG. 13 is a flowchart illustrating an example of selection processing.

The selection unit 261B may select the map in considering both the number of contents recorded in the map and the date and time of updating. Hereinafter, selection processing considering the number of contents and the date and time of updating will be described. FIG. 13 is a flowchart illustrating an example of the selection processing. For example, the flowchart in FIG. 13 is executed by the autonomous driving device 1B at the timing when the vehicle 2 travels a position which is set as a recording target in a plurality of maps.

Position measurement processing (S70), scheduled traveling section determination processing (S72), and number of contents acquisition processing (S74) illustrated in FIG. 13 are the same as the position measurement processing (S50), the scheduled traveling section determination processing (S52) and the number of contents acquisition processing (S54) illustrated in FIG. 12, respectively.

Subsequently, as latest map selection processing (S75), the selection unit 261B compares the date and time of updating the contents included in the scheduled traveling section in the first map 24A with the date and time of updating the contents included in the scheduled traveling section in the second map 25A, and then, selects the latest map. Hereinafter, the description will be made under the assumption that the first map 24A is the latest map.

Subsequently, as determination processing (S76), the selection unit 261B determines whether or not the number of contents included in the scheduled traveling section in the latest map (first map 24A) is greater than the number of contents included in the scheduled traveling section of the non-latest map (second map 25A).

When it is determined that the number of contents included in the scheduled traveling section in the latest map (first map 24A) is greater than the number of contents included in the scheduled traveling section of the non-latest map (second map 25A) (YES in S76), the selection unit 261B selects the latest map (first map 24A) as the map to be used for the autonomous driving as the selection processing (S78). On the other hand, when it is determined that the number of contents included in the scheduled traveling section in the latest map (first map 24A) is not greater than the number of contents included in the scheduled traveling section of the non-latest map (second map 25A) (NO in S76), as the determination processing (S79), the selection unit 261B determines whether or not a difference between the numbers of common types of contents included in the scheduled traveling sections in the latest map and the non-latest map is equal to or greater than a threshold value. The threshold value is set in advance in order to calculate the difference of the number of contents.

When it is determined that the difference between the numbers of common types of contents included in the scheduled traveling sections in the latest map and the non-latest map is equal to or greater than a threshold value (YES in S79), the selection unit 261B selects the latest map (first map 24A) as the map to be used for the autonomous driving as selection processing (S78). That is, the autonomous driving device 1B gives a priority to the map of which the date and time of updating is new even though the number of contents is small under the consideration that the road has been changed.

On the other hand, when it is determined that the difference between the numbers of common types of contents included in the scheduled traveling sections in the latest map and the non-latest map is smaller than the threshold value (NO in S79), the selection unit 261B selects the non-latest map (second map 25A) as a map to be used for autonomous driving as selection processing (S80). That is, the autonomous driving device 1B gives a priority to the map of which the date and time of updating is old and the number of contents is large under the consideration that the road has not been changed.

When the selection processing (S78) or the selection processing (S80) is completed, the autonomous driving device 1B ends the flowchart illustrated in FIG. 13. As described above, the autonomous driving device 1B is configured to be able to select one map based on the date and time of updating and the number of contents when the first map 24A and the second map 25A in which the ranges of recording the positions overlap are used. The flowchart illustrated in FIG. 13 can be executed again at the timing when the travel plan is generated again. The autonomous driving processing subsequently performed is the same as that in FIG. 7.

Operational Effects of the Third Embodiment

According to the autonomous driving device 1B in the third embodiment, it is possible to select one map from a plurality of maps based on the number of contents. In addition, the autonomous driving device 1B can select one map from a plurality of maps based on the date and time of updating and the number of contents.

Fourth Embodiment

A configuration of an autonomous driving device 1C in a fourth embodiment is different from the autonomous driving device 1A in the second embodiment in the points that a part of functions of the selection unit 261B are different, and that a history database 28 is included therein, and other configurations are the same. The overlapping descriptions will not be repeated below.

Figure 14:
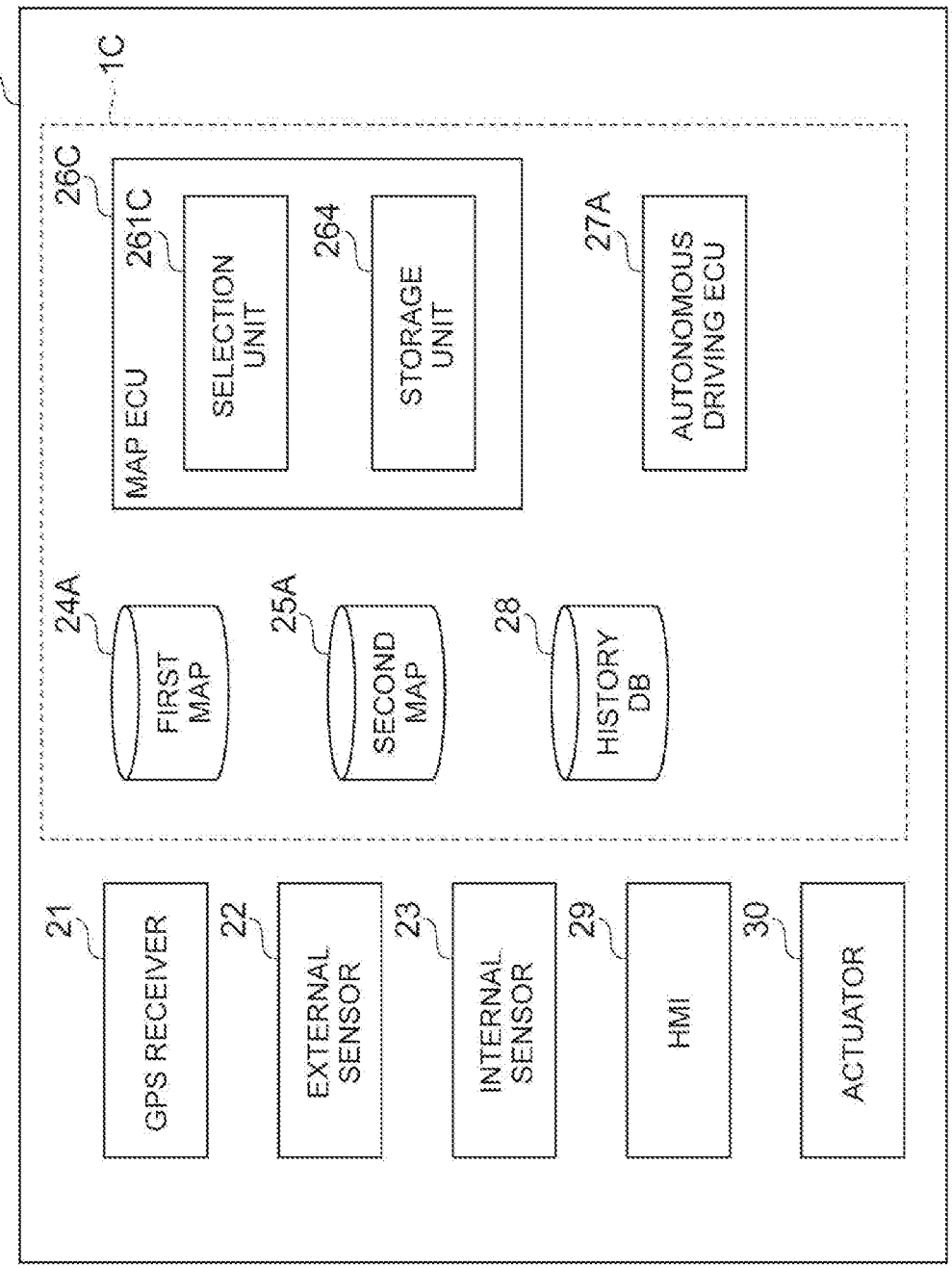
FIG. 14 is a block diagram illustrating an example of a configuration of a vehicle including an autonomous driving device in a fourth embodiment.

FIG. 14 is a block diagram illustrating an example of the configuration of the vehicle 2 including the autonomous driving device 1C in the fourth embodiment. As illustrated in FIG. 14, the autonomous driving device 1C includes the first map 24A, the second map 25A, a history database 28, a map ECU 26C, and the autonomous driving ECU 27A.

The map ECU 26C is the same as the map ECU 26 as hardware. Functionally, the map ECU 26C includes a selection unit 261C and a storage unit 264.

The storage unit 264 stores a driving history of the vehicle 2 in the history database 28. The storage unit 264 stores the map (the first map 24A or second map 25A) selected by the selection unit 261C and history information in the history database 28 in association with each other. The history information is a driving situation when the autonomous driving is performed using the map selected by the selection unit 261C. The history information includes the presence or absence of an override. The override is an intervention by the driver in the autonomous driving. The history database 28 is a database in which the map selected by the selection unit 261C and the history information are associated with other.

The selection unit 261C is different from the selection unit 261B in the logic of selecting the map. Specifically, the selection unit 261C selects the map under a condition different from the predetermined condition in the third embodiment. An example of the predetermined condition relates to the history of autonomous driving. The selection unit 261C generates an override occurrence rate for each map based on the number of overrides in a predetermined time referring to the history database 28. The selection unit 261C selects a map having a low override occurrence rate between the first map 24A and the second map 25A.

Between the first map 24A and the second map 25A, the selection unit 261C may select a map having a low override occurrence rate in a predetermined period of time. Alternatively, the selection unit 261C may select a map in which the number of overrides is 0 during the most recent traveling. In addition, the selection unit 261C may acquire aggregated history information from a plurality of vehicles from a server such as a central management center. Other configurations of the vehicle 2 are the same as those in the first embodiment. The operation of the autonomous driving device is the same as that in FIG. 10 and FIG. 7.

Operational Effects of the Fourth Embodiment

According to the autonomous driving device 1C in the fourth embodiment, it is possible to select one map from a plurality of maps based on the history information.

The embodiments described above can be implemented in various forms in which various changes and improvements are made based on knowledges of those skilled in the art.

In the embodiments described above, example in which the autonomous driving device includes the first map and the second map, but the present disclosure is not limited thereto. For example, the autonomous driving device may include equal to or more than three maps. The vehicle 2 may acquire a map from a server in a central management center or the like. In addition, the vehicle 2 may acquire map update information from a server in the central management center or the like.

In the embodiments described above, the first content is the lane boundary line and the second content is the pole, but the present disclosure is not limited thereto. The first content and the second content may be any content as long as the types thereof are different from each other. For example, the second content may be a speed limit. In this case, the autonomous driving device may use the speed limit "0" as the information indicating that the speed limit is not present. In a case of speed limit "0", the autonomous driving device may adopt a logic for controlling a manually set speed as the upper limit speed. Alternatively, the second content may be a date and time. In this case, the autonomous driving device may use the date and time "0" as the information indicating that the date and time are not present. In a case of date and time "0", the autonomous driving device may adopt the logic treating the content associated with the date and time is not present.

In the first embodiment described above, the reading processing (S14 and S16) may be performed in parallel without performing the determination processing (S12) illustrated in FIG. 6. In the first embodiment, since the first map 24 and the second map 25 are different from each other in the ranges of recording the positions, even if the information on the traveling point is read from both the first map 24 and the second map 25, only the information on one of the maps is acquired.

In the first embodiment described above, the first method has been described as an example of the logic for the estimation of the host vehicle position, but the present disclosure is not limited thereto. For example, an obstacle avoidance logic or a travel planning logic may be used.

(Reliability of the Maps)

The autonomous driving device according to the embodiments described above may switch the driving mode between the autonomous driving and the driving assistance depending on the reliability of the maps. As an example, the reliability is assigned to the maps. The reliability is an index indicating a result of evaluating the accuracy of a map. For example, as the reliability increases, the map is evaluated as being accurate. The autonomous driving device collates the recorded content of the map with the result of detection by the external sensor 22, and then, sets the reliability higher as the coincidence in the result of collation increases. Alternatively, a server in the central management center or the like may determine the reliability of the maps.

Figure 15:
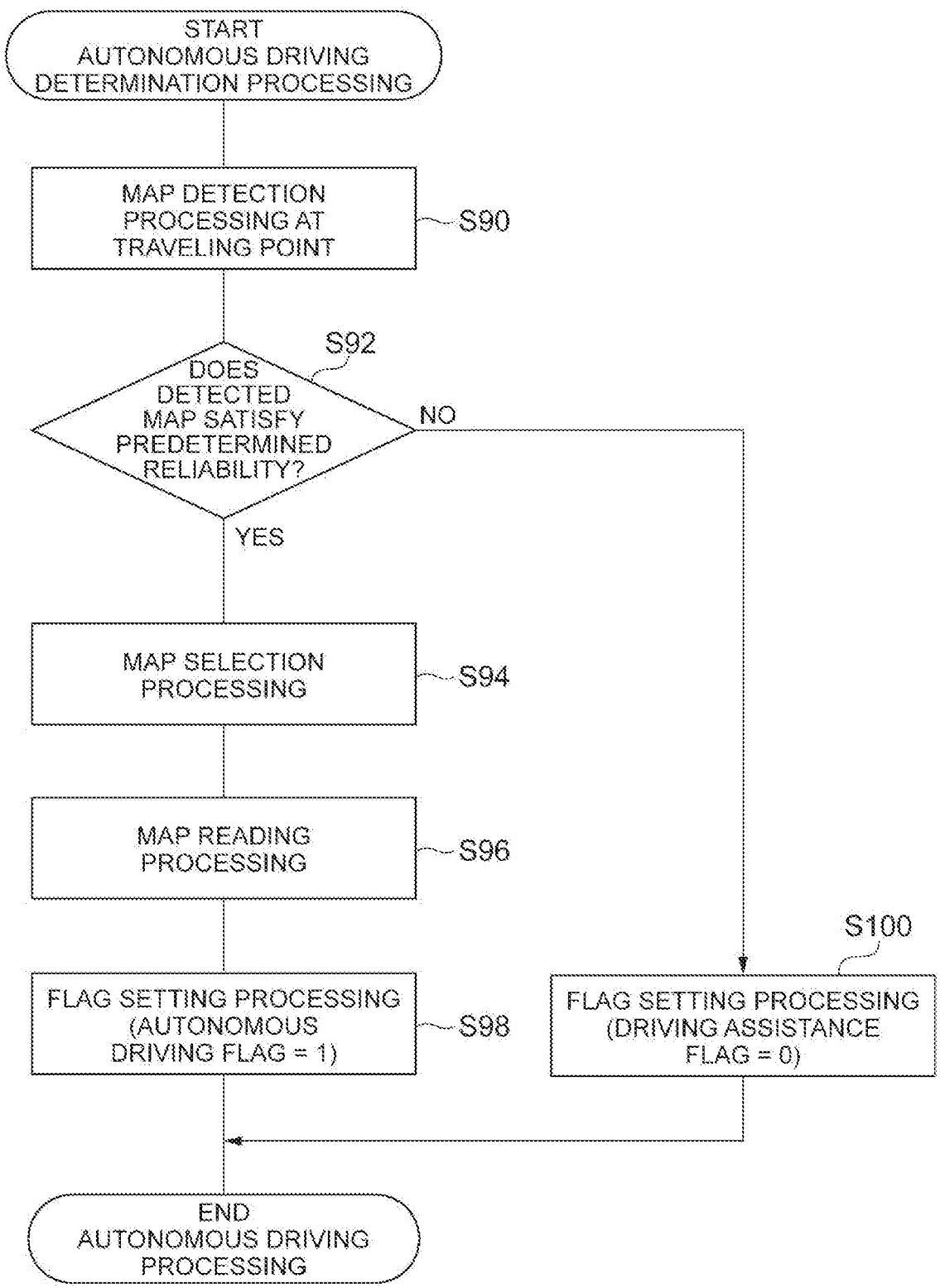
FIG. 15 is a flowchart illustrating an example of autonomous driving determination processing.

Hereinafter, the details of the autonomous driving determination processing to switch the driving mode between the autonomous driving and driving assistance depending on the reliability of the maps will be described. FIG. 15 is a flowchart illustrating an example of the autonomous driving determination processing. For example, the flowchart illustrated in FIG. 15 is executed by the autonomous driving device at the timing when the ON-operation of the autonomous driving function by the driver of the vehicle 2 is received. The autonomous driving device may be any of the autonomous driving devices out of the autonomous driving device 1A to the autonomous driving device 1C. The autonomous driving device 1A will be used as a representative device in the description below.

As illustrated in FIG. 15, the autonomous driving ECU 27A of the autonomous driving device 1A detects a map corresponding to the traveling point of the vehicle 2 as map detection processing (S90). This processing is the same as the map detection processing (S40) in FIG. 10.

Subsequently, as determination processing (S92), the autonomous driving ECU 27A determines whether or not the reliability of the map detected in the map detection processing (S90) satisfies a predetermined reliability. For example, the autonomous driving ECU 27A determines whether or not the reliability of the first map 24A is equal to or higher than a threshold value. The threshold value is a value set in advance for determining the reliability of the map. Similarly, the autonomous driving ECU 27A determines whether or not the reliability of the second map 25A is equal to or higher than the threshold value.

When it is determined that the reliability of the map detected in the map detection processing (S90) satisfies the predetermined reliability (YES in S92), as map selection processing (S94), the autonomous driving ECU 27A selects a map to be used for the autonomous driving from a map that satisfies the predetermined reliability. When the maps that satisfy the predetermined reliability are present in plural, one map is selected from a plurality of maps based on the selection method in the embodiments described above.

Subsequently, as reading processing (S96), the autonomous driving ECU 27A reads the information from the map. Subsequently, as flag setting processing (S98), the autonomous driving ECU 27A sets the autonomous driving flag to "1". The autonomous driving flag is a flag for determining whether or not to start the autonomous driving processing. The autonomous driving flag is initialized to "0" at the start time in the flowchart in FIG. 15.

When it is determined that the reliability of the map detected in the map detection processing (S90) does not satisfy the predetermined reliability (NO in S92), as flag setting processing (S100), the autonomous driving ECU 27A sets the driving assistance flag to "1". The driving assistance flag is a flag for determining whether or not to start the driving assistance processing. The driving assistance flag is initialized to "0" at the start time in the flowchart in FIG. 15. The driving assistance means that the system assists the driver's driving, and for example, a steering assistance for the driver and a speed adjustment assistance for the driver are included therein. As an example, the steering assistance is an assistance to give a steering torque such that the traveling position in the lane where the vehicle 2 travels is maintained. As an example, the speed adjustment assistance is an assistance to operate the throttle actuator or the brake actuator such that the set speed of the vehicle 2 and the speed of the preceding vehicle match each other.

When the flag setting processing (S98) or the flag setting processing (S100) is completed, the autonomous driving ECU 27A ends the flowchart illustrated in FIG. 15. In this way, the autonomous driving device may switch the driving mode between the autonomous driving and the driving assistance depending on the reliability of the maps.

(Modification Example of the Travel Plan)

The autonomous driving device 1 to the autonomous driving device 1C may change premise information of the travel plan according to the map. As described above, the autonomous driving ECU generates the travel plan in which the vehicle 2 travels within a range not exceeding the predetermined upper limit speed. In addition, the first map includes not only the lane boundary lines but also the information on the poles, and the second map includes only the information on the lane boundary line and does not include the information on the poles. Therefore, a position accuracy in the vertical direction along the lane by the estimation of the host vehicle position using the first map is higher than that by the estimation of the host vehicle position using the second map. For this reason, the autonomous driving control using the first map has a smaller vertical error than the autonomous driving control using the second map. Accordingly, in the autonomous driving control using the first map, the vehicle is less likely to be forced out from the curve even if the speed is somewhat high compared to the case of the autonomous driving control using the second map. For this reason, the autonomous driving ECU sets the upper limit speed higher when generating the travel plan using the first map compared to the case of generating the travel plan using the second map. In this way, when the number of contents stored in the map is large, the autonomous driving devices can mitigate the speed constraints compared to the case where the number of contents stored in the map is small.

Figure 16:
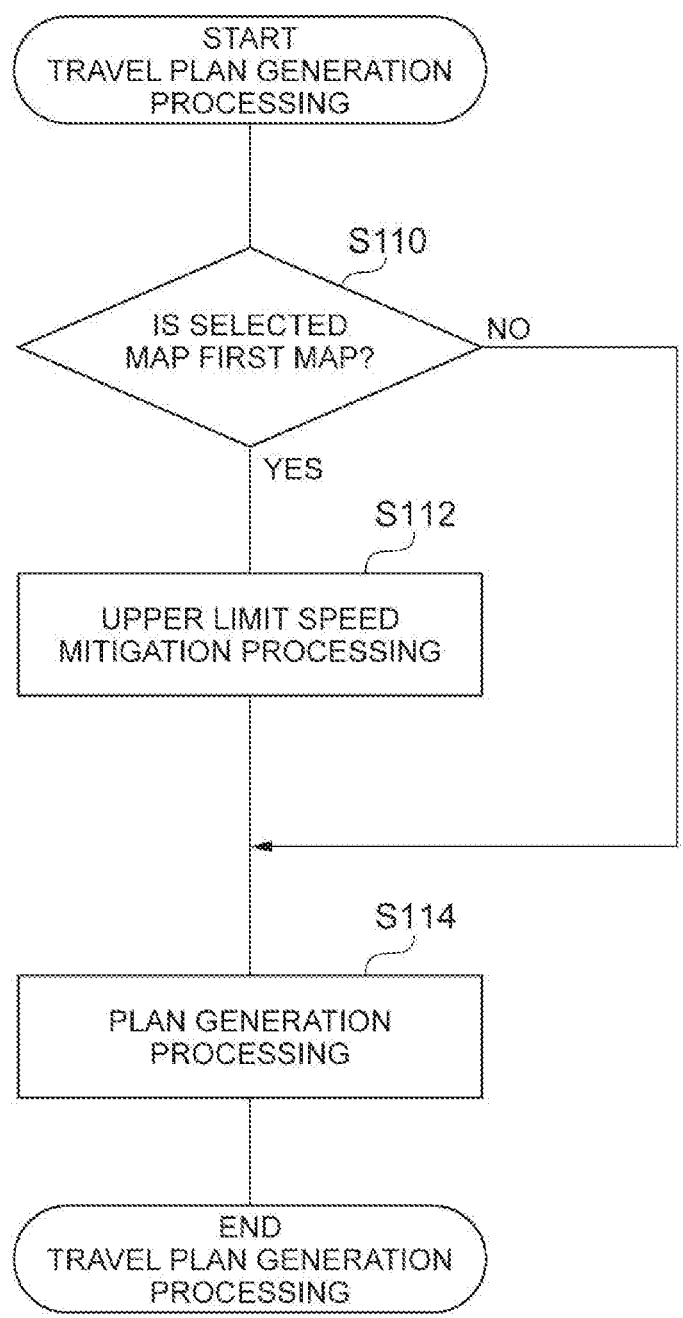
FIG. 16 is a flowchart illustrating an example of travel plan generation processing.

Hereinafter, the autonomous driving device that switches the speed according to the map will be described in detail. FIG. 16 is a flowchart illustrating an example of travel plan generation processing. The flowchart illustrated in FIG. 16 is executed by the autonomous driving device as the travel plan generation processing (S30) in FIG. 7, for example. The autonomous driving device may be any of the autonomous driving devices out of the autonomous driving device 1 to the autonomous driving device 1C. The autonomous driving device 1A will be used as a representative device in the description below.

As illustrated in FIG. 16, the autonomous driving ECU 27A of the autonomous driving device 1A determines whether or not the selected map is the first map 24A as determination processing (S110).

When it is determined that the selected map is the first map 24A (YES in S110), as upper limit speed mitigation processing (S112), the autonomous driving ECU 27A increases the preset reference upper limit speed as much as a predetermined value. The predetermined value is determined in advance, for example, 5 km/h to 10 km/h.

When the upper limit speed mitigation processing (S112) is completed or when it is determined that the selected map is not the first map 24A (NO in S110), as plan generation processing (S114), the autonomous driving ECU 27A generates a travel plan using the upper limit speed. When the plan generation processing (S114) is completed, the flowchart illustrated in FIG. 16 ends. As described above, the autonomous driving device may change the upper limit speed used for creating a travel plan according to the map.

In addition, as described above, in the autonomous driving control using the first map, the vehicle is less likely to be forced out from the curve even if the speed is somewhat high compared to the case of the autonomous driving control using the second map. Therefore, when the autonomous driving is performed using the first map, the autonomous driving device may reduce the frequency of alarms that notify of the lane departure compared to the case of performing the autonomous driving using the second map.

What is claimed is:

1. An autonomous driving device configured to perform an autonomous driving on a vehicle, comprising:
   a first map including a first content and a second content associated with positions respectively;
   a second map including the first content associated with the position and in which the second content is not a recorded target;
   a map electronic control unit (ECU) including a processor programmed to:
      measure a position of the vehicle via communication;
      determine a scheduled traveling section in the first map and the second map based on the position of the vehicle; and
      select any one of the first map and the second map based on a predetermined condition; and
   an autonomous driving ECU including a processor programmed to perform the autonomous driving on the vehicle based on any one of the first map and the second map,
   wherein the map ECU selects a map having a larger number of updates of contents included in the scheduled traveling section between the first map and the second map,
   wherein the autonomous driving ECU is further programmed to:
      perform the autonomous driving on the vehicle using the map selected,
      determine information necessary for the autonomous driving on the vehicle using a first method based on the first content and the second content corresponding to a first position recorded in the first map when the autonomous driving is performed using the first map at the first position, and
      determine the information necessary for the autonomous driving on the vehicle using a method same as the first method based on the first content corresponding to a second position recorded in the second map and information indicating that the second content corresponding to the second position recorded in the second map is not present, when the autonomous driving is performed using the second map at the second position.

2. A method for performing an autonomous driving on a vehicle based on a first map and a second map, the first map including a first content and a second content associated with positions respectively, the second map including the first content associated with the position and in which the second content is not a recorded target, the method comprising:
   measure a position of the vehicle via communication;
   determine a scheduled traveling section in the first map and the second map based on the position of the vehicle;
   select a map having a larger number of updates of contents included in the scheduled traveling section between the first map and the second map;
   perform the autonomous driving on the vehicle using the map selected,
   determine information necessary for the autonomous driving on the vehicle using a first method based on the first content and the second content corresponding to a first position recorded in the first map when the autonomous driving is performed using the first map at the first position, and
   determine the information necessary for the autonomous driving on the vehicle using a method same as the first method based on the first content corresponding to a second position recorded in the second map and information indicating that the second content corresponding to the second position recorded in the second map is not present, when the autonomous driving is performed using the second map at the second position.

3. A non-transitory computer-readable storage medium for performing an autonomous driving on a vehicle based on a first map and a second map, the first map including a first content and a second content associated with positions respectively, the second map including the first content associated with the position and in which the second content is not a recorded target, the medium storing a program for causing a computer to execute processing comprising:
   measure a position of the vehicle via communication;
   determine a scheduled traveling section in the first map and the second map based on the position of the vehicle;
   select a map having a larger number of updates of contents included in the scheduled traveling section between the first map and the second map;
   perform the autonomous driving on the vehicle using the map selected,
   determine information necessary for the autonomous driving on the vehicle using a first method based on the first content and the second content corresponding to a first position recorded in the first map when the autonomous driving is performed using the first map at the first position, and
   determine the information necessary for the autonomous driving on the vehicle using a method same as the first method based on the first content corresponding to a second position recorded in the second map and information indicating that the second content corresponding to the second position recorded in the second map is not present, when the autonomous driving is performed using the second map at the second position.

* * * * *